US012746164B2

(12) United States Patent
Mann et al.

(10) Patent No.: US 12,746,164 B2
(45) Date of Patent: Sep. 29, 2026

(54) TRANSPORT SYSTEM WITH CARE CART ASSEMBLY

(71) Applicant: Hill-Rom Services, Inc., Batesville, IN (US)

(72) Inventors: Nicholas Mann, Cincinnati, OH (US); David C. Newkirk, Lawrenceburg, IN (US); Todd P. O'Neal, Fairfield, OH (US); Travis A. Pelo, Columbus, OH (US); Jack Barney Sing, Batesville, IN (US); Neal Wiggerman, Batesville, IN (US); Robert Mark Zerhusen, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 308 days.

(21) Appl. No.: 18/443,787

(22) Filed: Feb. 16, 2024

(65) Prior Publication Data

US 2024/0277545 A1 Aug. 22, 2024

Related U.S. Application Data

(60) Provisional application No. 63/446,432, filed on Feb. 17, 2023.

(51) Int. Cl.
*A61G 12/00* (2006.01)
*A61G 7/08* (2006.01)

(52) U.S. Cl.
CPC .............. *A61G 12/001* (2013.01); *A61G 7/08* (2013.01); *A61G 2203/80* (2013.01)

(58) Field of Classification Search
CPC ..... A61G 12/001; A61G 2203/80; A61G 7/08
See application file for complete search history.

(56) References Cited

U.S. PATENT DOCUMENTS

| | | | |
|---|---|---|---|
| 4,584,989 | A * | 4/1986 | Stith |
| 4,796,313 | A | 1/1989 | DiMatteo et al. |
| 4,945,592 | A | 8/1990 | Sims et al. |
| 6,729,421 | B1 * | 5/2004 | Gluck |
| 7,562,883 | B2 | 7/2009 | Livengood et al. |
| 8,165,718 | B2 * | 4/2012 | Ota |

(Continued)

FOREIGN PATENT DOCUMENTS

FR 2858211 A1 * 2/2005 ........... A61G 12/001

*Primary Examiner* — James A Shriver, II
*Assistant Examiner* — Nicholas R. Kandas
(74) *Attorney, Agent, or Firm* — Price Heneveld LLP

(57) ABSTRACT

A transport system for a medical facility includes a support apparatus including a frame assembly. The frame assembly includes a frame connector. A care cart assembly includes a cart connector selectively coupled with the frame connector. The care cart assembly includes a body defining receiving spaces that are configured to receive care modules. Wheels are coupled to the body and configured to engage an underlying floor surface. A power drive system includes a power drive wheel operable between a retracted position spaced from the underlying floor surface and a deployed position engaging the underlying floor surface. The care cart assembly is configured to drive movement of the support apparatus with the power drive system when coupled with the support apparatus and when the power drive wheel is engaging the underlying floor surface.

20 Claims, 13 Drawing Sheets

(56) References Cited

U.S. PATENT DOCUMENTS

| | | | |
|---|---|---|---|
| 8,258,973 | B2 | 9/2012 | Newkirk |
| 10,277,057 | B2 * | 4/2019 | Chiu |
| 11,230,312 | B2 | 1/2022 | Kaushansky et al. |
| 2006/0016009 | A1 | 1/2006 | Mannix |
| 2006/0254834 | A1 | 11/2006 | Dassler et al. |

* cited by examiner

TRANSPORT SYSTEM WITH CARE CART ASSEMBLY

CROSS-REFERENCE TO RELATED APPLICATION

This application claims priority to and the benefit under 35 U.S.C. § 119(e) of U.S. Provisional Application No. 63/446,432, filed on Feb. 17, 2023, entitled "TRANSPORT SYSTEM WITH CARE CART ASSEMBLY," the disclosure of which is hereby incorporated herein by reference in its entirety.

FIELD OF THE DISCLOSURE

The present disclosure generally relates to a transport system, and more particularly to a transport system for a medical facility, which includes a care cart assembly.

SUMMARY OF THE DISCLOSURE

According to one aspect of the present disclosure, a transport system for a medical facility includes a support apparatus including a frame assembly. The frame assembly includes a frame connector on a head end thereof. At least one care cart assembly includes a cart connector that is configured to engage the frame connector to couple the care cart assembly to the frame assembly. The at least one care cart assembly is disposed adjacent to the head end when coupled to the support apparatus. The care cart assembly includes a body defining receiving spaces configured to receive care modules. Transport handles are coupled to the body. A battery is coupled to the body and configured to power the care modules disposed within the receiving spaces. A power drive system is coupled to the body and powered by the battery. The power drive system includes a power drive wheel operable between a retracted position and a deployed position. The care cart assembly is configured to drive movement of the support apparatus with the power drive system when the power drive wheel is in the deployed position.

According to one aspect of the present disclosure, a transport system for a medical facility includes a support apparatus including a frame assembly. The frame assembly includes a frame connector. A care cart assembly includes a cart connector selectively coupled with the frame connector. The care cart assembly includes a body defining receiving spaces that are configured to receive care modules. Wheels are operably coupled to the body and configured to engage an underlying floor surface. A power drive system includes a power drive wheel operable between a retracted position spaced from the underlying floor surface and a deployed position engaging the underlying floor surface. The care cart assembly is configured to drive movement of the support apparatus with the power drive system when coupled with the support apparatus and when the power drive wheel is engaging the underlying floor surface.

According to one aspect of the present disclosure, a care cart assembly for a transport system that includes a support apparatus, where the care cart assembly includes a body having a cart connector configured to engage a support apparatus. The body defines receiving slots configured to receive care modules. Wheels are coupled to the body via a support arm and configured to engage a floor surface. A battery is coupled to the body. A power drive system is coupled to the body. The power drive system includes a power drive wheel operable between a retracted position spaced from the floor surface and a deployed position engaging the floor surface. When the power drive wheel is in the deployed position, the power drive wheel is configured to drive movement of the care cart assembly and, consequently, the support apparatus. The care cart assembly also includes a controller communicatively coupled to the power drive system.

These and other features, advantages, and objects of the present disclosure will be further understood and appreciated by those skilled in the art by reference to the following specification, claims, and appended drawings.

DETAILED DESCRIPTION

Figure 1:
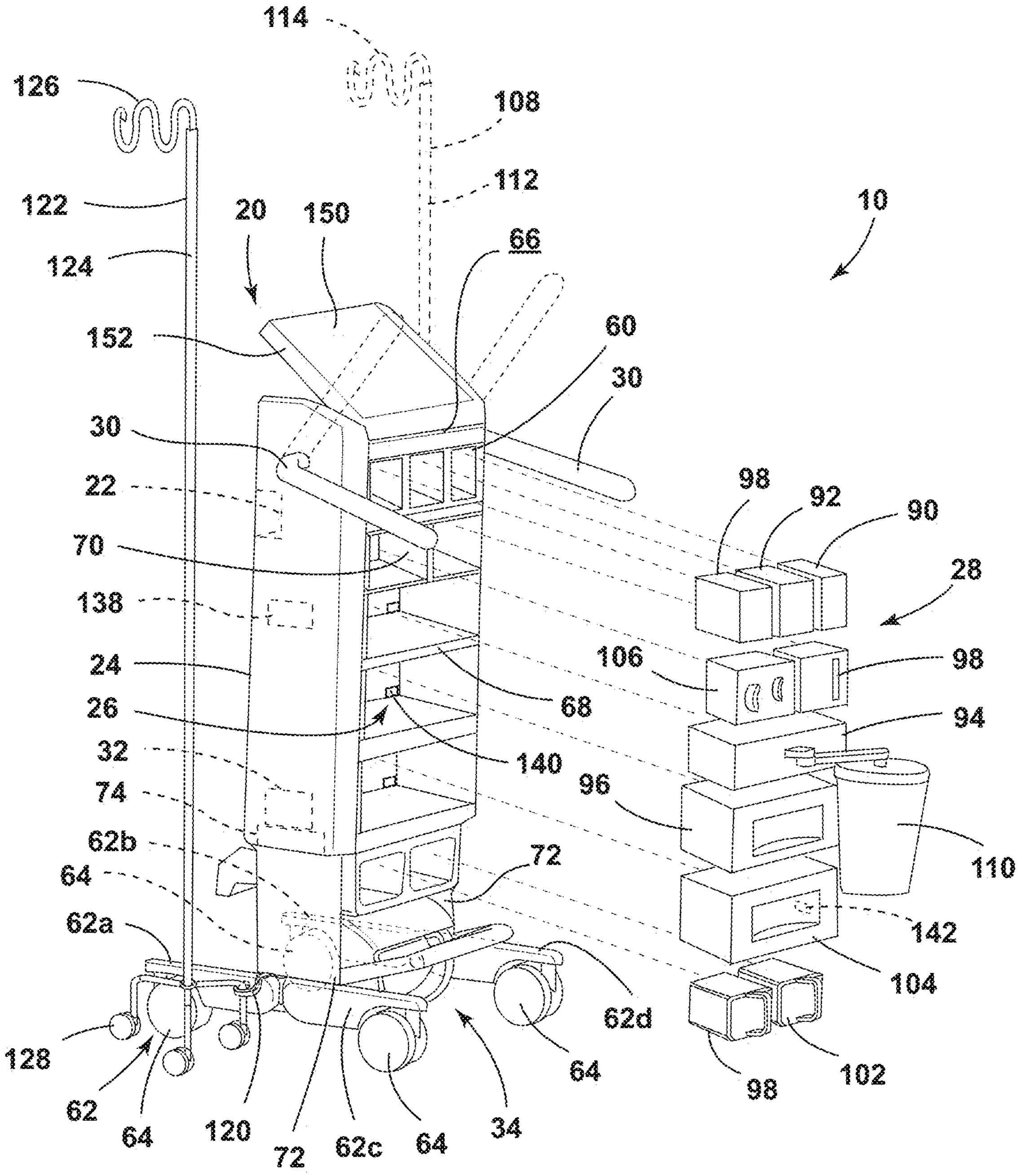
FIG. 1 is an exploded side perspective view of a care cart assembly for a transport system, according to the present disclosure.

The present illustrated embodiments reside primarily in combinations of method steps and apparatus components related to a transport system with a care cart assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

With reference to FIGS. 1-20, reference numeral 10 generally designates a transport system 10 for a medical facility that includes a support apparatus 12. The support apparatus 12 includes a frame assembly 14 with a frame connector 16 on a head end 18 thereof. The transport system 10 also includes a care cart assembly 20 that includes a cart connector 22. The cart connector 22 is configured to engage the frame connector 16 to couple the care cart assembly 20 to the frame assembly 14. They care cart assembly 20 is disposed adjacent to the head end 18 when coupled to the support apparatus 12. The care cart assembly 20 includes a body 24 defining receiving spaces 26 or receiving slots 26 configured to receive care modules 28 and transport handles 30 coupled to the body 24. A battery 32 is coupled to the body 24 and configured to power the care modules 28 disposed within the receiving slots 26. A power drive system 34 is coupled to the body 24 and is powered by the battery 32. The power drive system 34 includes a power drive wheel 36 operable between a retracted position 38 and a deployed position 40. The care cart assembly 20 drives movement of the support apparatus 12 with the power drive system 34 when the power drive wheel 36 is in the deployed position 40.

Figure 3:
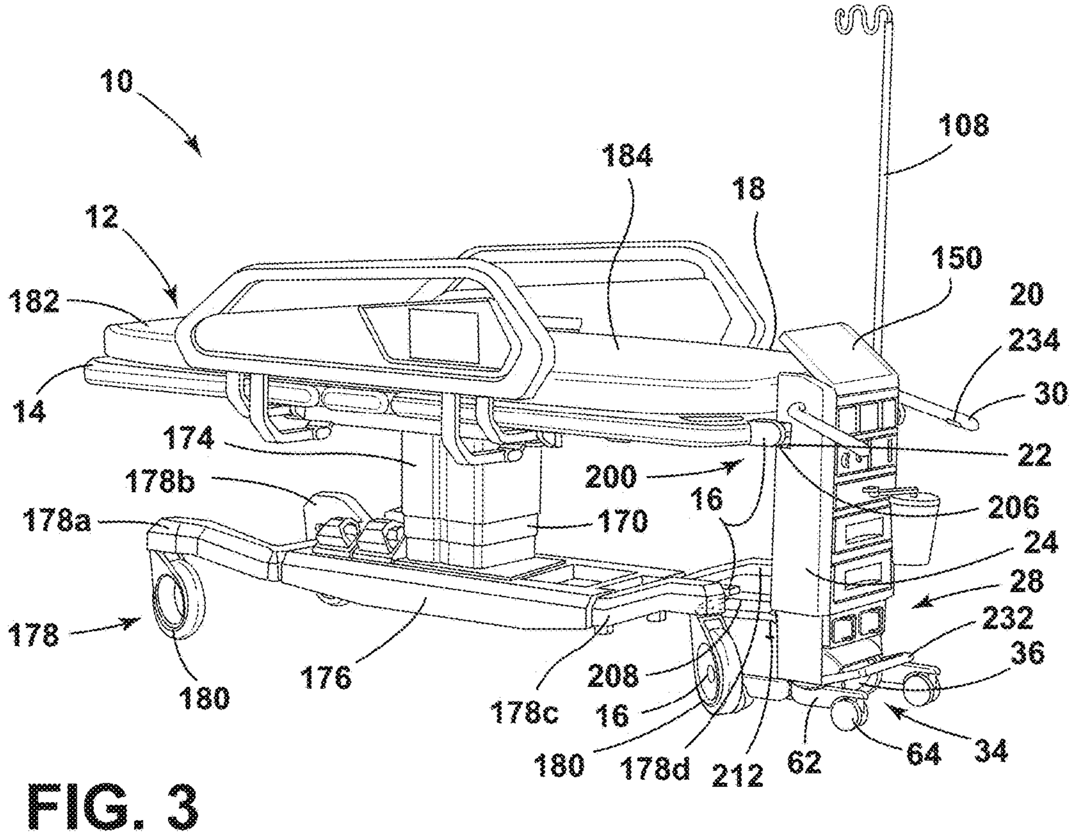
FIG. 3 is a side perspective view of a transport system including a care cart assembly docked to a support apparatus, according to the present disclosure.

Referring to FIG. 1, the care cart assembly 20 is configured to be moved throughout a medical facility in conjunction with moving a patient on the support apparatus 12 (FIG. 3). The care cart assembly 20 includes the body 24, which defines a storage space 60 for storing items and medical devices for caring for or treating the patient as described herein. The care cart assembly 20 includes support arms **62*a-d*, collectively referred to herein as support arms 62, each having a wheel 64 for engaging an underlying floor surface. The wheels 64 may be configured to rotate about a vertical axis to assist with steering the care cart assembly 20. In the illustrated configuration, two support arms 62*a*, 62*b* extend in a first direction beyond an inner or rear side of the care cart assembly 20, and two support arms 62*c*, 62*d* extend in a second direction beyond an outer or front side of the care cart assembly 20. As described herein, the rear side is configured to face the support apparatus 12 (FIG. 3), while the front side defines the receiving slots 26** accessible by a caregiver.

As illustrated, the support arms 62 may extend parallel to one another. The support arms **62*a*, 62*b* on one side of the body 24 may be set farther apart than the support arms 62*c*, 62*d* on the opposing side, forming an offset configuration. Additionally or alternatively, the support arms 62*a*, 62*b* extending in one direction may define a widening "V" shape, while the support arms 62*c*, 62*d* extending in the opposing direction may define a narrowing "V" shape. The offset configuration or the "V" shapes may be advantageous for nesting two care cart assemblies 20 adjacent to one another. Further, this configuration may allow for multiple care cart assemblies 20 to be stacked adjacent to one another (e.g., front-to-back) in a nested arrangement for storage or charging as described herein (see FIG. 15). In this way, the first set of wheels 64 on the support arms 62*c*, 62*d* from the first care cart assembly 20 are disposed between the second set of wheels 64 on the support arms 62*a*, 62*b* of the second care cart assembly 20, where the body 24 of the second care cart assembly 20 at least partially disposed between the support arms 62*a*, 62*b* and/or the wheels 64 of the adjacent care cart assembly 20**.

The care cart assembly 20 also includes the transport handles 30 for providing a grasping or pushing location for the caregiver. The transport handles 30 are generally configured to rotate between different positions. In various examples, the transport handles 30 are configured to rotate between at least one vertical position and a horizontal position. When in the first vertical position, the transport handles 30 extend vertically upwards from the body 24. The vertical position may be defined between about 45 degrees and about 90 degrees relative to a top surface 66 of the body 24. This position may be advantageous for pushing the care cart assembly 20 and the support apparatus 12 as described herein. The transport handles 30 may have features, such as indents or grips, that define boundaries for the hand of the caregiver or features to form a more ergonomic grasp for the caregiver.

The horizontal position may be defined between about 45 degrees and about −45 degrees relative to the top surface 66 of the body 24 (where the top surface 66 forms a generally horizontal surface or 0-degree location). The horizontal position may be advantageous for moving the care cart assembly 20 when the care cart assembly 20 is separated from the support apparatus 12. In such examples, the transport handles 30 may generally rotate about 90 degrees overall between the first vertical position and the horizontal position.

Further, the transport handles 30 may also be configured to rotate to the second vertical position, which is generally a stowed position. The second vertical position may be defined between about −45 degrees and about −90 degrees relative to the top surface 66 of the body 24. In this way, the transport handles 30 extend toward the underlying floor surface, which may be advantageous for nesting multiple care cart assemblies 20 or increasing access to the receiving slots 26. In such examples, the transport handles 30 may rotate about 180 degrees overall between the first vertical position, the horizontal position, and the second vertical position. The transport handles 30 are generally configured to provide clearance for the caregiver to grasp both transport handles 30 and walk proximate to the care cart assembly 20 without interfering with the power drive wheel 36 (e.g., provide clearance for the caregiver to walk).

Referring still to FIG. 1, the storage space 60 of the care cart assembly 20 is configured to receive and store various interchangeable care modules 28 during transport of the care cart assembly 20 with the patient The storage space 60 can be divided into multiple receiving spaces 26. In the illustrated example, the receiving spaces 26 are configured as receiving slots 26 that receive the care modules 28. The receiving spaces 26 may also be configured as receiving cavities 26, that can house more than one care module 28. In additional non-limiting examples, the receiving spaces 26 may include a hook or support bar to hang the care modules 28. In further non-limiting aspects, the receiving spaces 26 may have connection features, and the care modules 28 have mating connection features to engage and be coupled to the care cart assembly 20. Additional or alternative configurations for coupling the care modules 28 to the body 24 and storing the care modules 28 within the storage space 60 are contemplated without departing from the teachings herein.

In the illustrated example, the storage space 60 is divided by shelves 68 into rows of receiving slots 26. Accordingly, there is at least one receiving slot 26 per row. Additionally, some rows may be further divided by dividing walls 70, which extend vertically to define two or more receiving slots 26 in the row. The shelves 68 and/or the dividing walls 70 may be removable or moveable to different positions to increase flexibility of the care cart assembly 20.

The receiving slots 26 are configured to receive selected care modules 28. The care modules 28 may be quick-disconnect modules. For example, in the illustrated configuration, three receiving slots 26 of a smaller size are arranged adjacent to one another in the first row. In comparison, one larger receiving slot 26 is defined in the third row, having a width that is about equal to a combined width of the three receiving slots 26 of the first row. In this configuration, the first row is configured to receive multiple smaller care modules 28, whereas the third row is configured to receive a single larger care module 28. Generally, the care modules 28 have predefined sizes, which correspond with the size and shape of the receiving slots 26. Multiple care modules 28 generally have the same or similar sizes and shapes to be received within the same receiving slots 26 and interchanged with one another. Accordingly, the caregiver can select different care modules 28, interchange care modules 28, and rearrange care modules 28 to further personalize and customize the care cart assembly 20. The care cart assembly 20 provides a single wheeled structure that can accept multiple quick-connect modules 28.

Referring still to FIG. 1, the care cart assembly 20 may also include supports 72 extending between the body 24 and the support arms 62. The supports 72 may also be included as part of the body 24. The supports 72 extend generally parallel to one another and are offset from the body 24. The supports 72 are arranged at a width that is less than a width of the body 24. In certain aspects, the supports 72 define a space therebetween, which is configured to receive additional care modules 28 and provide space for the power drive wheel 36. There may be an additional shelf 68 and/or dividing walls 70 or other support features extending between the supports 72 to assist in housing the care modules 28. In such examples, this shelf 68 may couple to an adjacent shelf 68 and/or the supports 72 and may be removable. Additionally or alternatively, the care modules 28 may be configured to be coupled to a bottom of the body 24 between the supports 72.

In various examples, the body 24 may define receiving channels 74 for receiving the supports 72. In such examples, a height of the body 24 may be adjusted relative to the underlying floor surface by moving the supports 72 into the receiving channels 74 and lowering the body 24. When the body 24 is lowered, the body 24 does not impede the space for the power drive wheel 36.

Figure 2:
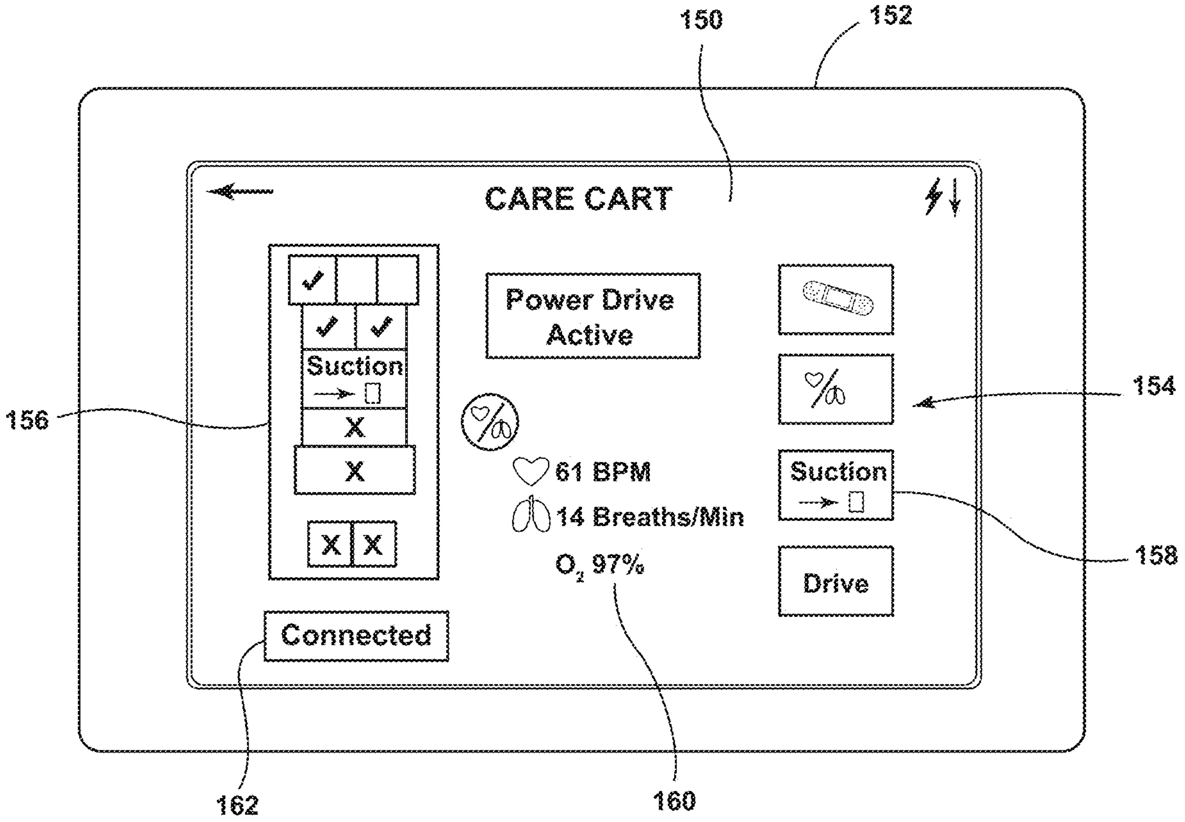
FIG. 2 is representative of a user interface on a control panel including information from a care cart assembly, a transport system, and a patient, according to the present disclosure.

Referring still to FIG. 1, as well as FIG. 2, the transport system 10 includes multiple care cart assemblies 20 that can be adjusted based on various factors. The care cart assembly 20 is used in conjunction with the support apparatus 12 (FIG. 3) to provide items and devices for caring for the patient on the support apparatus 12 during a transport period, which includes the time before transport, the time actively transporting the patient, and the time after the transport. Accordingly, the care cart assembly 20 stores the care modules 28 that may be needed by the caregiver during this transport period.

The different care cart assemblies 20 may include the same care modules 28, the same care modules 28 in a different arrangement, or different care modules 28. The care modules 28 included in the care cart assembly 20 may be based on the patient or the caregiver. Additionally or alternatively, the care modules 28 included in the care cart assembly 20 may be based on the unit or area of the medical facility where the care cart assembly 20 is being used, where the patient is received, and/or where the patient is transported. The unit may be an initial unit or primary unit where the patient is received, and the care cart assembly 20 can be changed based on use in a subsequent unit to where the patient is later transferred.

For example, in an emergency department, the care cart assembly 20 may be more generalized to provide items and devices more commonly utilized in the emergency department. In such examples, the care cart assemblies 20 may have the same or similar care modules 28. In a different unit where the patient remains for a longer period of time, such as days, the care cart assembly 20 may be more personalized for the treatment of the specific patient. In such examples, each care cart assembly 20 in the unit may include different care modules 28.

The care modules 28 may include or be configured as a variety of items and devices used for treating a caregiver. The care module 28 may be configured as or include, but is not limited to, an infusion pump 90, an intravenous (IV) pump 92, a portable suction assembly 94, a ventilator 96, a vital signs monitor 98, such as a heart rate monitor, a respiration rate monitor, and/or a $SpO_2$ monitor, onboard storage 102 for leads such as electrocardiogram leads, an oxygen holder 104, an oxygen generator 106, other practicable onboard storage, and other medical devices.

Referring still to FIGS. 1 and 2, the care cart assembly 20 can include multiple care modules 28 that include or are configurated as medical or treatment devices. The infusion pump 90 and the IV pump 92, which is a type of infusion pump 90, are utilized to deliver fluid to the patient in a controlled manner. Each of the infusion pump 90 and the IV pump 92 can be utilized with an IV pole 108 for supporting the fluids to be delivered. The portable suction assembly 94 generates negative pressure, generally to remove an obstruction from an airway of the patient.

The portable suction assembly 94 may include a pump for generating the negative pressure, tubing, and a container 110 for collecting materials that are suctioned via the pump and the tubing. The ventilator 96 is configured to direct air into lungs of the patient to assist in maintaining proper oxygen levels. The vital signs monitor or monitors 98 are configured to sense and monitor various vital signs of the patient, including heart rate, respiration rate, and blood oxygen levels or oxygen saturation levels ($SpO_2$). The oxygen holder 104 may be an oxygen tank or other container for storing oxygen. The oxygen generator 106 is configured to separate oxygen from compressed air to provide oxygen to the patient.

The care cart assembly 20 can also include care modules 28 including or configured for storage. The care module 28 may provide onboard storage 102 for leads. The lead wires include an end to engage the patient and an end to engage the electrocardiogram machine. Additional leads stored in the care module 28 may be utilized to determine impedance. Further, the care modules 28 may provide storage for other treatment materials such as bandages, wraps, gauze, tapes, syringes, tubing of different sizes, etc. The care modules 28 may be configured in similar shapes and sizes or different categories of common shapes and sizes (e.g., small, large, etc.) to allow for greater interchangeability between the care modules 28.

It is also contemplated that the care module 28 may be configured as the power drive system 34. In such examples, the power drive wheel 36 may be coupled to and selectively removed from a bottom of the body 24.

Referring still to FIGS. 1 and 2, the care cart assembly 20 may also include the IV pole 108 extending from the body 24. The IV pole 108 may be fixed to the body 24 or may be removable similar to the care modules 28. The IV pole 108 includes a pole support 112 configured to telescope between a use position, extending vertically upward from the body 24, and a storage position, retracted to be stored adjacent to or in the body 24. When in the use position, the IV pole 108 is configured to extend vertically to expose hooks 114 for supporting an IV bag at an elevated height. In the storage position, the IV pole 108 is configured to retract and rotate relative to the body 24. The retracted IV pole 108 is configured to extend along a surface of the body 24 or within a cavity or channel of the body 24 to minimize space used by the IV pole 108.

Further, storing the IV pole 108 when not in use may increase accessibly for the caregiver to the care modules 28 and/or the patient. The IV pole 108 may be utilized in conjunction with the care modules 28. For example, when one of the care modules 28 is the IV pump 92, the IV pole 108 may also be in the use position.

In additional or alternative examples, the care cart assembly 20 includes a latching hook 120 extending from the body 24. The latching hook 120 may be used in combination with a portable IV pole 122. In various aspects, the portable IV pole 122 may have a pole support 124, hooks 126, and wheels 128 for engaging the underlying floor surface. Generally, a manual force applied to the pole support 124 by the caregiver causes the wheels 128 to roll across the underlying floor surface to move the portable IV pole 122 to various locations. In the illustrated configuration, the latching hook 120 is configured to couple with and retain the portable IV pole 122. In this way, as the care cart assembly 20 is moved across the underlying floor surface, the latching hook 120 may catch and retain the portable IV pole 122 for movement with the care cart assembly 20. Accordingly, the portable IV pole 122 is moved with the care cart assembly 20 and may remain in connection with the care cart assembly 20 until disengaged by the caregiver. The latching hook 120 may include retaining features for maintaining the engagement with the portable IV pole 122 to prevent inadvertent disengagement during transport. The retaining features may automatically engage the portable IV pole 122 to provide more convenient and efficient engagement during movement of the care cart assembly 20.

Referring still to FIGS. 1 and 2, the care cart assembly 20 includes a controller 138, which is configured to selectively communicate with the care modules 28 when the care modules 28 are inserted into the receiving slots 26. In various examples, the body 24 of the care cart assembly 20 includes first communication connectors 140 aligned with and exposed to each receiving slot 26, and each of the care modules 28 includes a second mating communication connector 142. When the care modules 28 are inserted into the receiving slots 26 or otherwise coupled to the body 24, the communication connectors 140, 142 may engage one another.

In various examples, the engagement of the communication connectors 140, 142 indicates the insertion of the care module 28. In such examples, the caregiver may add additional information about the configuration of the care module 28 and/or the location in the storage space 60. In additional examples, this engagement indicates the insertion of the care module 28 and provides information to the controller 138 for the controller 138 to determine which care module 28 was inserted. In further non-limiting examples, this engagement may provide communication between the controller 138 and the care module 28, allowing the controller 138 to activate, adjust, deactivate, or otherwise control the inserted care module 28. Depending on the configuration of the care module 28, the care modules 28 may be controlled via input features on the care module 28 and/or inputs through a user interface 150 of the care cart assembly 20. The controller 138 may be configured to determine which care modules 28 are included in the care cart assembly 20, the location of the care module 28 in the body 24, and, depending on the type of care module 28, control the function of the care module 28. The communication connectors 140, 142 may provide for electrical and/or data communication between the care cart assembly 20 and the care modules 28.

Referring still to FIGS. 1 and 2, the care cart assembly 20 includes the user interface 150 on an upper portion thereof. Generally, the user interface 150 is part of a control panel

152 coupled to the top surface 66 of the body 24. The user interface 150 extends at an acute angle relative to the top surface 66 of the body 24, which may provide more convenient or efficient viewing of the information on the user interface 150 by the caregiver. In various aspects, the control panel 152 is configured to rotate relative to body 24 of the care cart assembly 20. The control panel 152 may rotate to abut the top surface 66 of the care cart assembly 20, which may be advantageous for stowing the user interface 150 and/or increasing access to the head area of the patient. The control panel 152 may also rotate away from the top surface 66 of the body 24. For example, the control panel 152 may be rotated to 90° or a greater angle, which may be advantageous for viewing information on the user interface 150 while engaging or interchanging the care modules 28.

The user interface 150 is generally a graphical user interface 150 for receiving caregiver inputs relating to the various care modules 28 and electronic components of the care cart assembly 20 described herein. In certain aspects, the user interface 150 may be configured as a liquid-crystal display (LCD) screen or other similar display. The user interface 150 may be configured to dynamically update and adapt based on the care modules 28 included in the care cart assembly 20. The controller 138 is configured to determine the type and/or location of the care modules 28 installed in the care cart assembly 20 and communicate the information to the caregiver via the user interface 150.

For example, icons 154 that correspond with the care modules 28 disposed within the receiving slots 26 may be displayed on the user interface 150. The icons 154 may also be arranged to correspond with the arrangement of the care modules 28 (e.g., rows, within rows, etc.). In additional or alternative configurations, the icons 154 relating to the installed care modules 28 may be distinguished, such as being illuminated, highlighted, or otherwise differentiated from the icons 154 that relate to uninstalled care modules 28. Moreover, the controller 138 may automatically associate the icons 154 with the type of the care modules 28 or, alternatively, the caregiver may manually name or identify the various icons 154. In such examples, the controller 138 may indicate that a care module 28 is inserted in a specific receiving slot 26, and the caregiver can further identify the type of care module 28. Further, the user interface 150 may include a graphical representation 156 of the care cart assembly 20, showing the type and location of the care modules 28.

In addition to the icons 154 indicating the care modules 28 are installed, the caregiver may also view information related to the care modules 28 and the patient through the user interface 150. For example, the user interface 150 may display module information 158 such as but not limited to, activation status, any practicable error messages, current function or mode, capacity or level of treatment items (e.g., liquids, medicines, etc.), etc. The user interface 150 may also display information 160 about the patient obtained by the care modules 28, such as but not limited to, heart rate, respiration rate, etc.

Further, the user interface 150 is configured to display a variety of information 162 about the care cart assembly 20 and the support apparatus 12, such as but not limited to, battery status for the care cart assembly 20, charging status for the battery 32, engagement between the care cart assembly 20 and the support apparatus 12, status of a power drive mode for the power drive system 34, including physical engagement, data communication, power transfer, etc.

Figure 4:
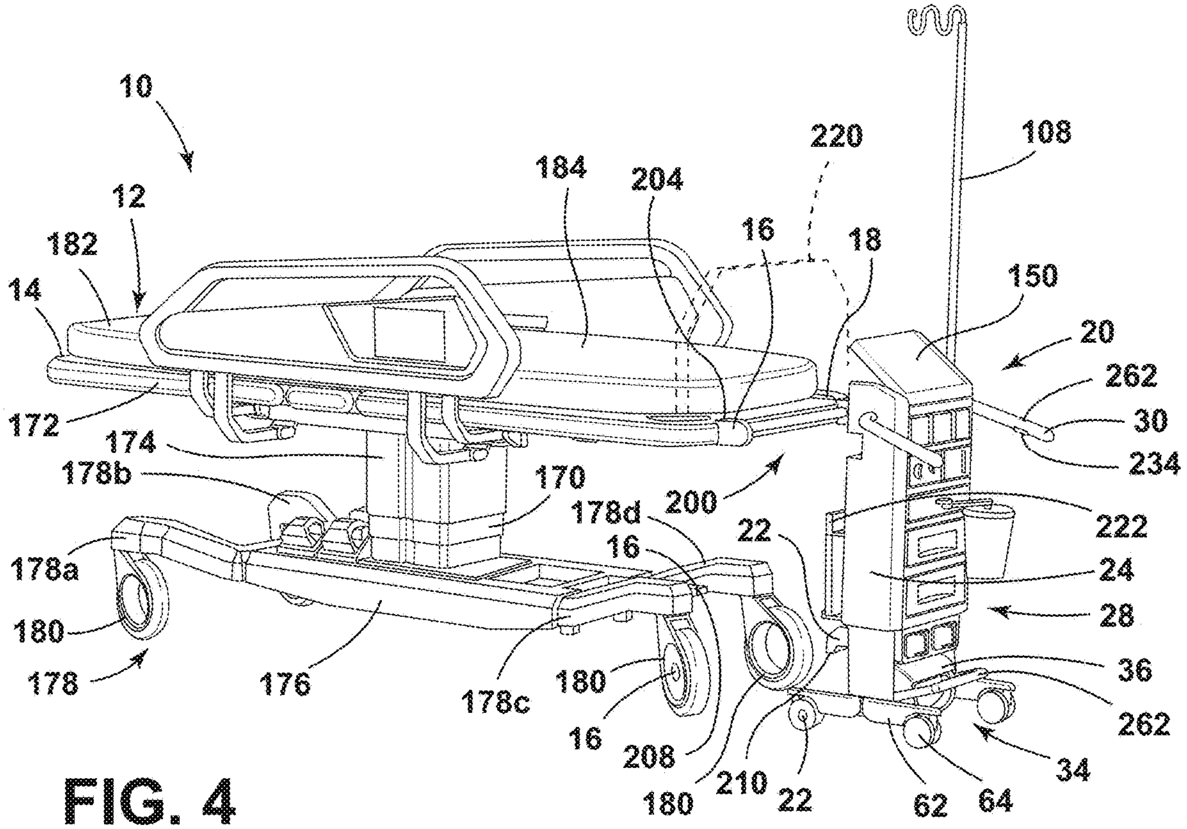
FIG. 4 is a side perspective view of a transport system including a care cart assembly undocked from a support apparatus, according to the present disclosure.

Referring still to FIG. 1, as well as FIGS. 3 and 4, the transport system 10 includes multiple care cart assemblies 20 and multiple support apparatuses 12. The care cart assemblies 20 are configured to be selectively coupled or docked to the support apparatus 12. The care cart assemblies 20 may be interchanged between different support apparatuses 12 and different types of support apparatuses 12. The care cart assembly 20 is configured to store items for treating the patient during the transport time, as well as propel and facilitate movement of the support apparatus 12.

In the illustrated configuration, the support apparatus 12 is configured as a stretcher, which has the frame assembly 14 that includes a base frame 170 and an upper frame 172 coupled to the base frame 170. The upper frame 172 generally forms a deck for supporting a patient thereon, while the base frame 170 includes a pedestal 174 and a base support 176. The pedestal 174 extends between the upper frame 172 and the base support 176. The pedestal 174 is generally centrally located relative to the upper frame 172 though it is contemplated that more than one pedestal 174 may be included in the support apparatus 12. Support legs **178*a*-178*d*, collectively referred to as support legs 178, are coupled to and extend from the base support 176 and include wheels or rollers 180, allowing the support apparatus 12 to be transportable around the medical facility. Generally, two support legs 178*a*, 178*b* extend toward a foot end 182 of the support apparatus 12, and two support legs 178*c*, 178*d* extend toward the head end 18. Other configurations of the support apparatus 12 may be included in the transport system 10**, including, but not limited to, other stretcher configurations, medical beds, wheelchairs, procedural recliners, etc.

The upper frame 172 is movable relative to the pedestal 174. The upper frame 172 may tilt, rotate, lift, lower, or otherwise move relative to the pedestal 174. Additionally, the upper frame 172 may include multiple segments that may be independently movable relative to one another, allowing movement of a certain portion of the upper frame 172 separately. The upper frame 172 defines a support surface, which is generally configured to support a surface assembly 184 for supporting a patient thereon. The surface assembly 184 may be configured as a mattress, a mattress pad or pads, a coverlet, or other support surfaces.

Referring still to FIGS. 1, 3, and 4, the care cart assembly 20 is configured to selectively engage the head end 18 of the support apparatus 12, allowing the caregiver to drive the support apparatus 12 with the care cart assembly 20 from proximate the head end 18. This configuration is advantageous for propelling the support apparatus 12 using the power drive system 34, as well as transporting the items and devices utilized for treating the patient.

Generally, the care cart assembly 20 is disposed adjacent to or abutting the frame assembly 14 when coupled thereto. In this way, the care cart assembly 20 is disposed adjacent to the support apparatus 12 during transport, rather than under the support apparatus 12 similar to conventional bed movers. The care cart assembly 20 extends to a height that is generally aligned with the support surface of the surface assembly 184 when the upper frame 172 is in a lowest position relative to the pedestal 174 and a horizontal or flat state, which is a typical position for transport. Moreover, when engaging the support apparatus 12, the rear of the body 24 engages the head end 18 of the frame assembly 14, leaving the care modules 28 facing outward and accessible to the caregivers.

In the illustrated example, the support legs 178 of the support apparatus 12 extend in a manner to provide space for the care cart assembly 20 therebetween. Accordingly, the support legs **178*c*, 178*d* extending toward the head end 18** of the support apparatus 12 extend at or to a width and/or lengths to allow for the docking of the care cart assembly 20 and minimize or prevent interference with the function of the rollers 180 on the support apparatus 12 and the wheels 64 on the care cart assembly 20. The care cart assembly 20 also has a width that is generally less than a width of the support apparatus 12. This may be advantageous for providing better control over the movement of the care cart assembly 20 and, consequently, the support apparatus 12, when driving the support apparatus 12.

The transport system 10 may have various latching assemblies 200 for coupling the care cart assembly 20 to the support apparatus 12. The latching assembly 200 may be based on the type of support apparatus 12, whether the support apparatus 12 also includes a power drive system 202, or other factors. The frame assembly 14 includes the frame connector 16 that may be included in one or more locations on the frame assembly 14. The frame connector 16 is configured to selectively engage the cart connector 22 to retain the engagement between the care cart assembly 20 and the support apparatus 12. This engagement is sufficient to retain the connection between the support apparatus 12 and the care cart assembly 20 during transport, including turning.

Referring still to FIGS. 3 and 4, in various examples, the frame assembly 14 includes multiple frame connectors 16 included on the upper frame 172, and the care cart assembly 20 is coupled to the upper frame 172. In such examples, the frame connectors 16 may be configured as one or multiple bayonet-style projections, extensions, or pins 204 extending from the upper frame 172. Generally, when the upper frame 172 is in a flat condition for transport (e.g., 0° of tilt), at least a portion of the pins 204 extend horizontally to the underlying floor surface. In this configuration, the care cart assembly 20 includes a corresponding number of cart connectors 22, which may be configured as receiving sockets 206 configured to receive and retain the pins 204. The receiving sockets 206 are defined proximate to the top surface 66 and aligned with the upper frame 172. Further, it is contemplated that the cart connectors 22 can be configured as pins 204, while the frame connectors 16 are configured as receiving sockets 206 without departing from the teachings herein. Further, a single pin 204 and receiving socket 206 may also be utilized.

In additional or alternative examples, the frame connector 16 is coupled to the base frame 170, and the cart connector 22 is coupled to a lower portion of the care cart assembly 20, such as the body 24 and/or the supports 72. In such examples, the frame connector 16 may be configured as a deployable arm 208 extending from the base support 176. The arm 208 may retract for storage on the base support 176 and be deployed for engagement with the care cart assembly 20. In this configuration, the cart connector 22 may be a catching lock 210 configured to catch and retain the deployed arm 208. The catching lock 210 may also be referred to as a slam lock. The deployable arm 208 may be, for example, a spring steel that is configured to flex and has a biasing force which may assist in retaining the engagement with the catching lock 210. A cable release 212 may be utilized to release the deployable arm 208 from the catching lock 210.

In further non-limiting examples, the care cart assembly 20 may be coupled to the rollers 180 of the support apparatus 12. In the illustrated configuration, the rollers 180 are configured as hoop casters defining a central opening. The frame connector 16 may be coupled to or defined by the hoop casters. The engagement between the frame connector 16 on the hoop casters and the cart connector 22 does not substantially impede the rotation and function of the hoop casters.

Referring still to FIGS. 3 and 4, one or multiple types and locations of engagements between the support apparatus 12 and the care cart assembly 20 may be used. Different engagements may be used for different types of support apparatuses 12. Further, a latch or additional components may be utilized to secure the engagement between the frame connector 16 and the cart connector 22. Moreover, an interference or frictional engagement between the frame connector 16 and the cart connector 22 may also be used. Based on the function of the care cart assembly 20, the care cart assembly 20 may be coupled to the upper frame 172, the base frame 170, or both. Additionally, different types, locations, or number of engagements may reduce twisting between the cart and the support apparatus 12.

Moreover, in various aspects, the support apparatus 12 may include a headboard 220 that is removable from the head end 18 thereof. The removal of the headboard 220 may provide increased access to the head area of the patient. The care cart assembly 20 may be configured to dock to the support apparatus 12 with or without the headboard 220. In certain aspects, the care cart assembly 20 may define a storage slot 222 for storing the headboard 220 during transport.

Referring to FIGS. 5-15, when the care cart assembly 20 is coupled to the support apparatus 12, the power drive system 34 on the care cart assembly 20 is configured to propel and drive the support apparatus 12 in the power drive mode, assisting the caregiver in transporting the support apparatus 12 and various treatment items about the medical facility. Accordingly, the power drive system 34 is configured to propel the care cart assembly 20 when the care cart assembly 20 is not engaged with the support apparatus 12, as well as propel and drive both the care cart assembly 20 and the coupled support apparatus 12. The power drive system 34 generally includes the drive wheel 36, which may be a fifth wheel centrally located and coupled to the body 24 of the care cart assembly 20. The drive wheel 36 is positioned between the supports 72. Moreover, the drive wheel 36 may be configured to assist the caregiver in steering both the care cart assembly 20 and the support apparatus 12 by providing a central pivot point about which the care cart assembly 20 can turn, which can consequently assist in steering the support apparatus 12.

In the illustrated example, the drive wheel 36 is configured as a wheel, caster, roller, or similar feature. The drive wheel 36 may allow fore-aft movement of the care cart assembly 20 and/or may be configured to move 360° to provide more efficient lateral or diagonal movement with the fore-and-aft movement, which may also assist with turning. Additional drive or propulsion features may also be used as the drive wheel 36 and may be referred to as a drive wheel assembly 36. For example, the drive wheel assembly 36 may be a track system, such as a continuous track driven by one or more additional wheels. In such examples, the track system includes a continuous band of tread, forming the continuous track that is disposed about one or a set of wheels. The drive wheel 36 is rotated by a motor and engages features on the tread to drive movement of the tread and, consequently, the care cart assembly 20. Further, such track systems also include at least one follower wheel to retain tension in the tread, providing the drive and propulsion forces. The drive wheel 36 or drive wheel assembly 36 may be included in or configured as any system that allows for a manual drive mode and a powered drive mode to propel both the care cart assembly 20 and the support apparatus 12.

Figure 5:
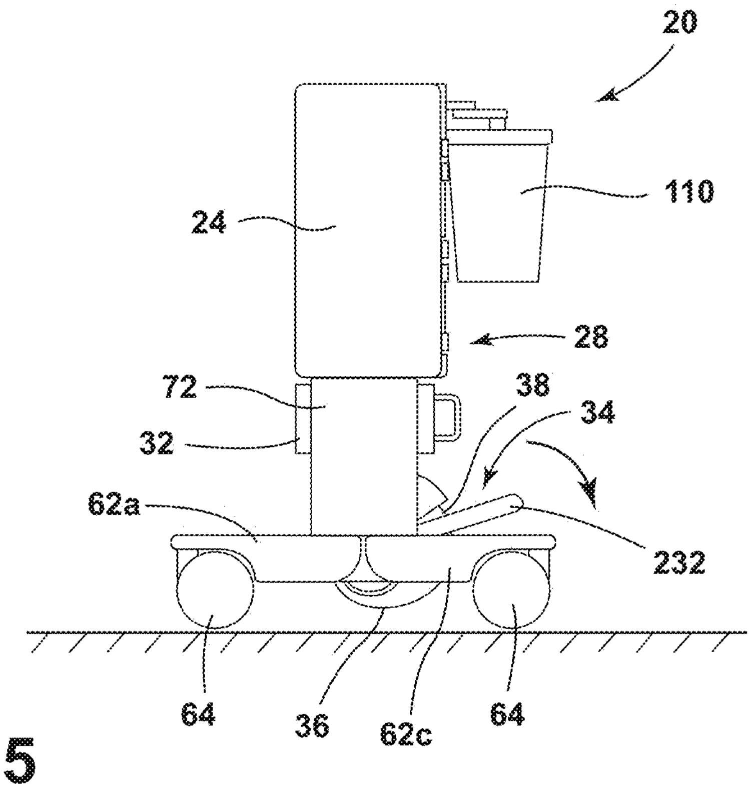
FIG. 5 is a side elevational view of a care cart assembly with a power drive wheel in a retracted position, according to the present disclosure.
Figure 6:
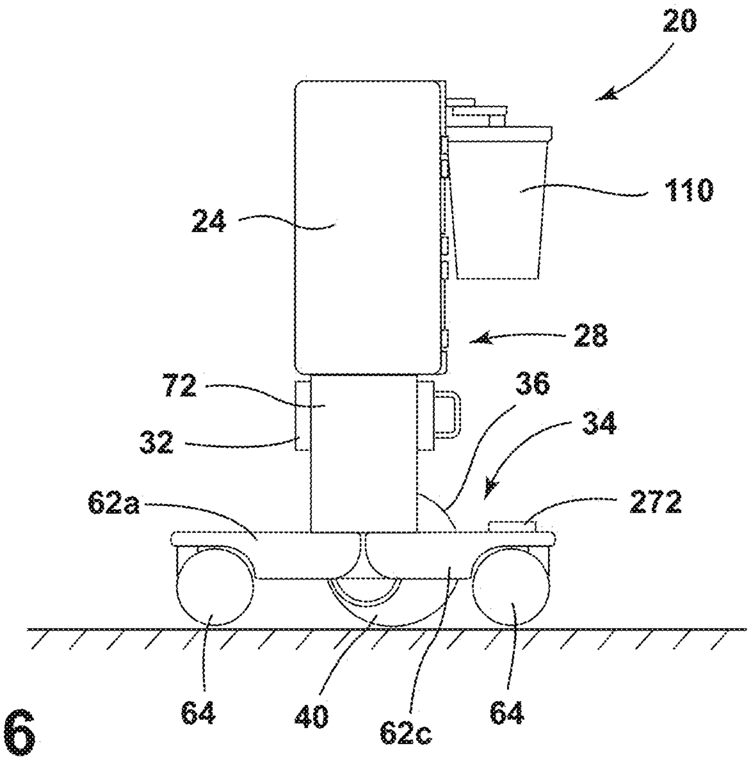
FIG. 6 is a side elevational view of a care cart assembly with a power drive wheel in a deployed position engaging an underlying floor surface, according to the present disclosure.
Figure 7:
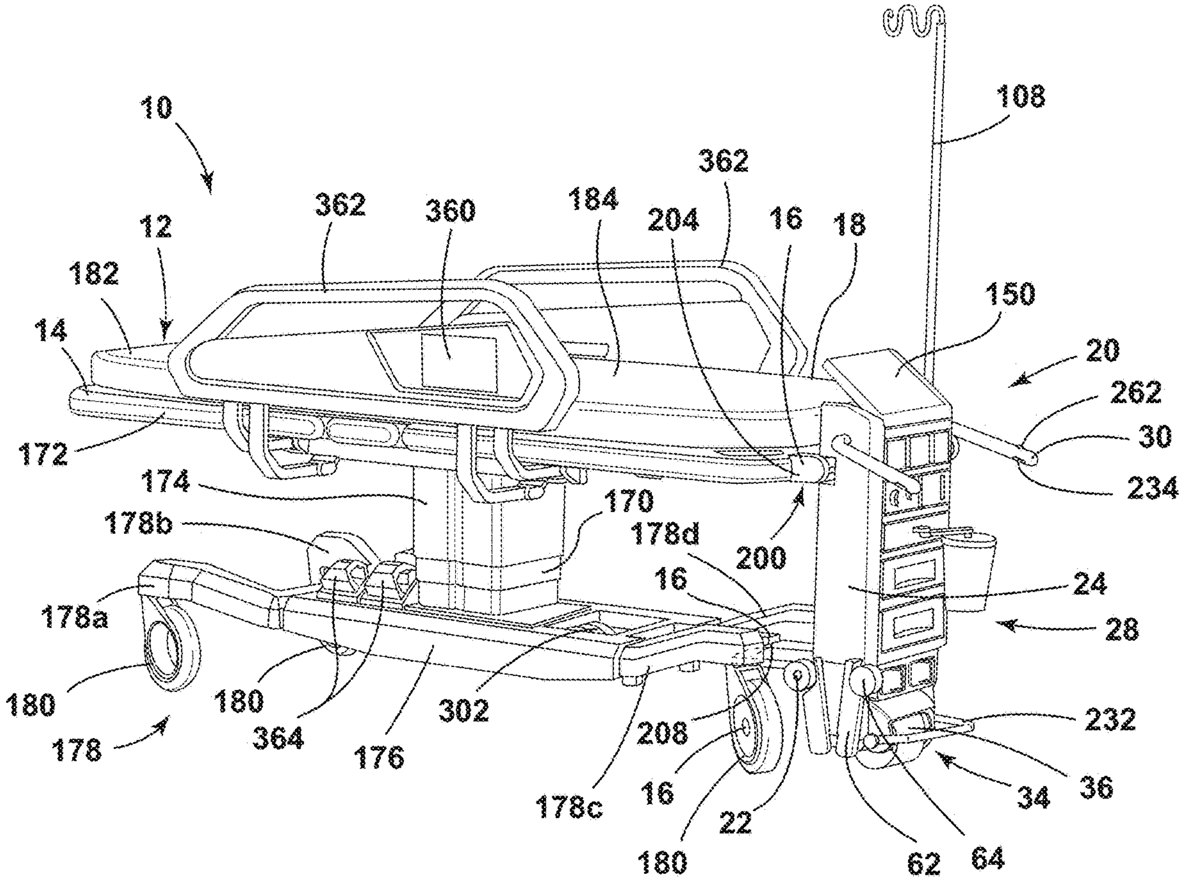
FIG. 7 is a side perspective view of a transport system with a care cart assembly having a power drive wheel in a deployed position, where the care cart assembly is engaged with a support apparatus, according to the present disclosure.

Referring still to FIGS. 5-7, the drive wheel 36 is generally operable between the deployed position 40, engaging the underlying floor surface, and the retracted position 38, spaced from the floor surface. The drive wheel 36 may be adjusted away from the floor surface to provide space for equipment to be disposed below the body 24 and to deactivate the power drive mode. The drive wheel 36 may engage the floor surface when in the manual drive mode and the power drive mode. The drive wheel 36 may also be adjusted away from the floor surface in the manual drive mode as well.

In various examples, the drive wheel 36 may be operably coupled with an actuator link assembly 230 that operates to adjust the drive wheel 36 relative to the floor surface. In such examples, the actuator link assembly 230 is configured to adjust the position of the drive wheel 36 in response to communication from the controller 138. The controller 138 may automatically adjust the drive wheel 36 based on an input (e.g., sensed docking, etc.) and/or in response to a caregiver input. Additionally or alternatively, the drive wheel 36 may be manually adjusted between the retracted and deployed positions 38, 40. In manual operation, the drive wheel 36 includes a foot bar 232, and the drive wheel 36 is adjustable via the foot bar 232. In such examples, the caregiver may press the drive wheel 36 to the deployed position 40 and pull the drive wheel 36 to the retracted position 38.

Various inputs received or determined by the controller 138 can cause the power drive wheel 36 to deploy and/or the power drive system 34 to activate. Such inputs may include but are not limited to, a caregiver input through the user interface 150, a press button on one of the transport handles 30, docking of the care cart assembly 20 to the support apparatus 12, the power drive wheel 36 engaging the floor surface, rotation of the transport handles 30 to the upright vertical position (e.g., the first vertical position), a force sensed by a strain gauge 234 in at least one of the transport handles 30, etc. The power drive wheel 36 deploying and/or the power drive system 34 activating can be caused by one input or a combination of inputs. Moreover, different modes of operation may be utilized to allow interaction, such as docking of the care cart assembly 20, to allow for use of the care cart assembly 20 without activation of the power drive system 34.

Referring again to FIGS. 8 and 9, the power drive system 34 includes a motor 236 operably coupled with the power drive wheel 36 for causing rotation of the power drive wheel 36 in the power drive mode. The motor 236 is generally a variable speed, bidirectional motor 236 that has a rotatable output shaft 238. In various aspects, a selectively engageable clutch 240 selectively couples the motor 236 to the drive wheel 36 when the clutch 240 is engaged. The clutch 240 includes a drive pulley 250 coupled to the output shaft 238 of the motor 236 and an axle of the drive wheel 36. A belt 254 extends between the drive pulley 250 and a follower or driven pulley 256 operably coupled with the drive wheel 36. An idler 258 is operably coupled to the body 24 and an actuator 260. The idler 258 is adjusted by the actuator 260 relative to the belt 254 to be either spaced from the belt 254 or pressed into the belt 254 to put the belt 254 under tension.

The power drive system 34 may operate in a manual drive mode of operation. In this mode, the idler 258 is spaced from the belt 254 and the power drive wheel 36 is free to rotate when the care cart assembly 20 is manually pushed. The power drive system 34 may also operate in the power drive mode of operation. In the power drive mode, the idler 258 is pressed against the belt 254 to transfer rotation from the motor 236 to the drive wheel 36 and propel the care cart assembly 20 and support apparatus 12.

Moreover, the power drive system 34 may operate in conjunction with the strain gauge 234 (FIG. 3). The amount of power provided by the motor 236 or speed of rotation of the motor 236 may be adjusted based on the force sensed by the strain gauge 234. In this way, the speed of the power drive system 34 may be adjusted to the cadence of the user based on the pressure from the strain gauge 234. Accordingly, the caregiver applying more force on the transport handles 30 and, consequently, on the strain gauge 234, results in faster rotation of the drive wheel 36. In comparison, the caregiver applying less force on the transport handles 30 and, consequently, on the strain gauge 234, results in slower rotation of the drive wheel 36. This may be advantageous for changing speeds for turning or slowing to a stop. Moreover, the transport handles 30 may include a switch 262 that is to remain engaged or activated during the transport period. If the caregiver releases the switch 262, the power drive system 34 may be deactivated to stop the movement of the support apparatus 12.

Figure 8:
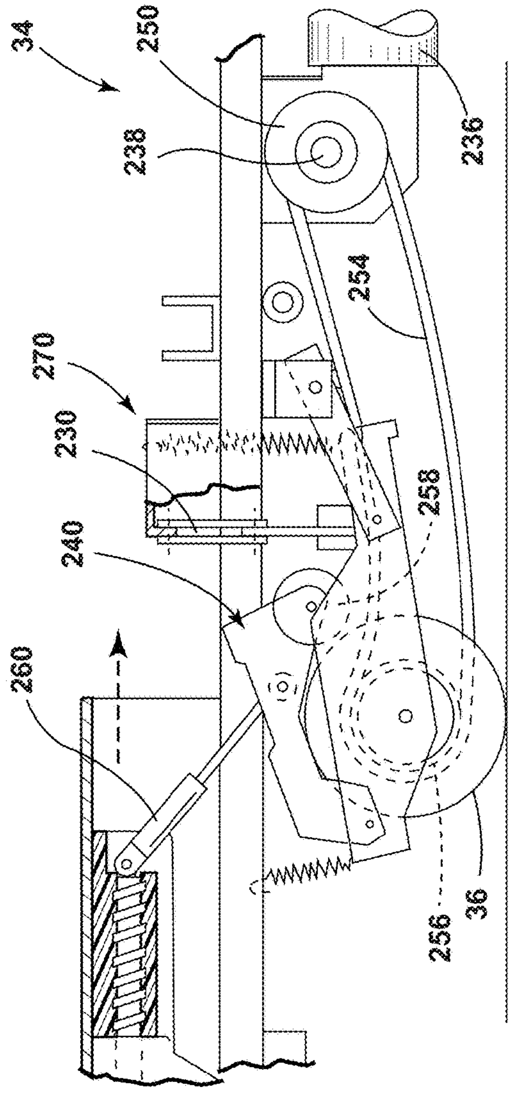
FIG. 8 is a partial side elevational view of a power drive system in a manual drive mode, according to the present disclosure.
Figure 9:
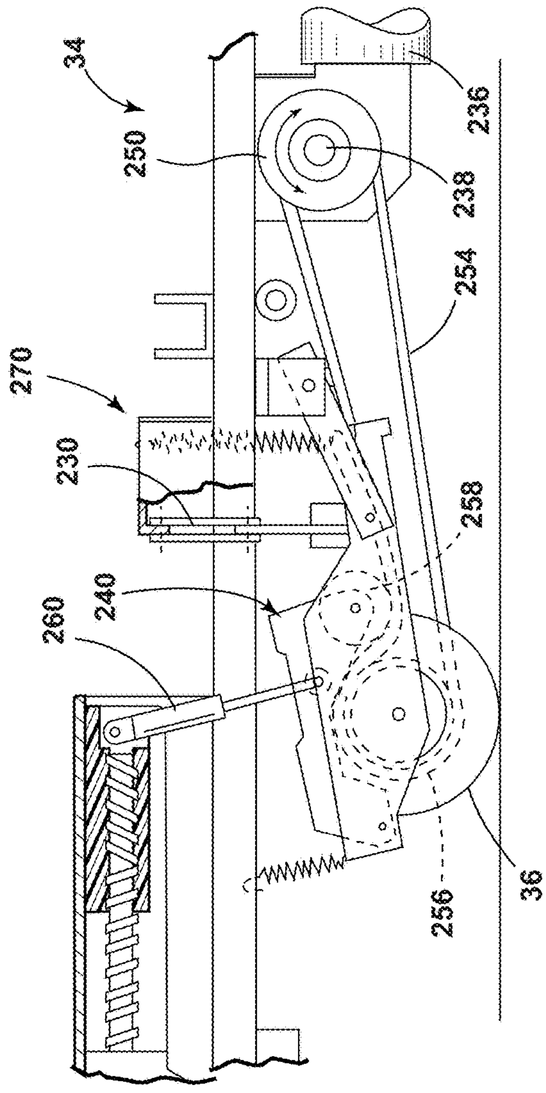
FIG. 9 is a partial side elevational view of a power drive system in a power drive mode, according to the present disclosure.
Figure 10:
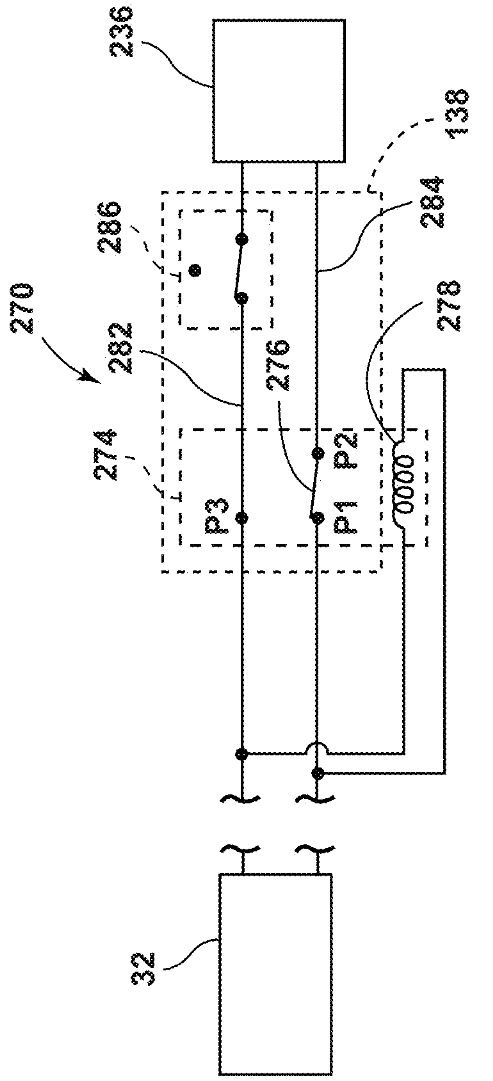
FIG. 10 is a schematic block diagram of a brake system in a drive mode, according to the present disclosure.
Figure 11:
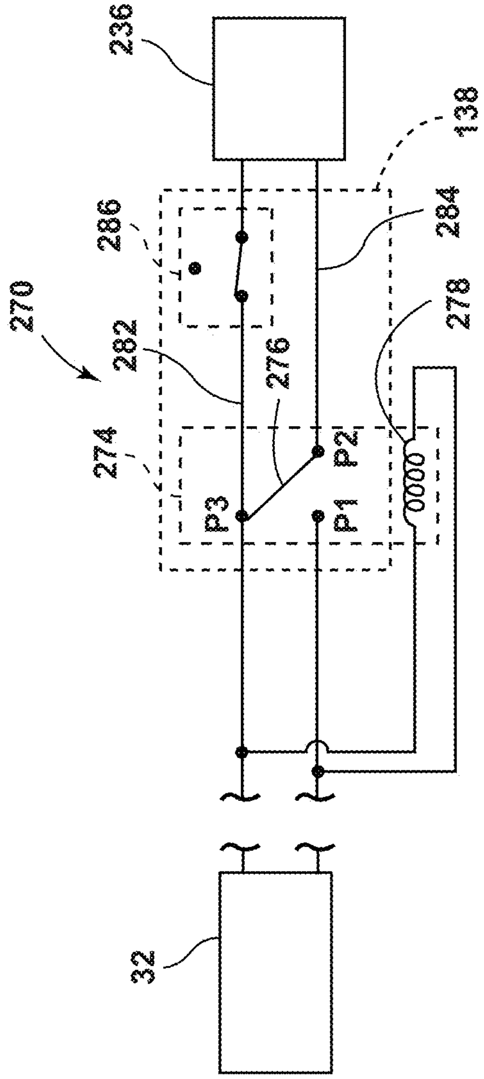
FIG. 11 is a schematic block diagram of a brake system in a braking mode, according to the present disclosure.

Referring still to FIGS. 8 and 9, as well as FIGS. 10 and 11, the power drive system 34 may be utilized with a brake system 270, which can be manually controlled, automatically controlled, or a combination thereof. In the manual brake system 270, the care cart assembly 20 may include a brake pedal 272 coupled to the body 24. In various examples, the pedal 272 may be a butterfly pedal 272, which controls both braking of the wheels 64 and releasing the brakes.

The brake system 270 may operate in conjunction with the power drive system 34. In such examples, the brake system 270 is operably coupled with the motor 236 and the drive wheel 36. The brake system 270 operates the drive wheel 36, as well as the other wheels 64 in a dynamic braking mode. When the controller 138 detects that the power supply to the motor 236 is at or above a predefined threshold, the drive wheel 36 is operating in the power drive mode. When the power is below the predefined threshold, the drive wheel 36 is operating in the dynamic braking mode.

In the dynamic braking mode, the controller 138 includes a relay 274 with a movable contact 276 which provides electric communication between pins P1, P2. When a sufficient current passes through a coil 278, the contact 276 is moved toward the pin P1 by the energized coil 278 against a biasing member, which causes the contact 276 to be drawn toward pin P3. The contact 276 of the relay 274 disconnects pins P1, P2 and provides electrical communication between the pins P2, P3. When the current through the coil 278 drops below a predefined value, the relay 274 is configured to open and connect pins P2, P3 based on a predefined voltage being applied to the motor 236.

The relay 274 functions to switch the motor 236 between the power drive mode and the dynamic braking mode. In the power drive mode, the relay 274 connects the power leads 282, 284 of the motor 236 to the battery 32, thereby supplying power for driving the motor 236, which consequently causes the drive wheel 36 to drive the care cart assembly 20. In the braking mode, the relay 274 disconnects the power lead 282 from motor 236 and instead shorts the power leads 282, 284 through the contact 276. In examples where the motor 236 includes a permanent magnet, shorting the leads 282, 284 causes the motor 236 to act as an electronic brake, resulting in the drive wheel 36 resisting movement of the care cart assembly 20. An override switch 286 may be provided to prevent the motor 236 from operating as the electronic brake.

Figure 12:
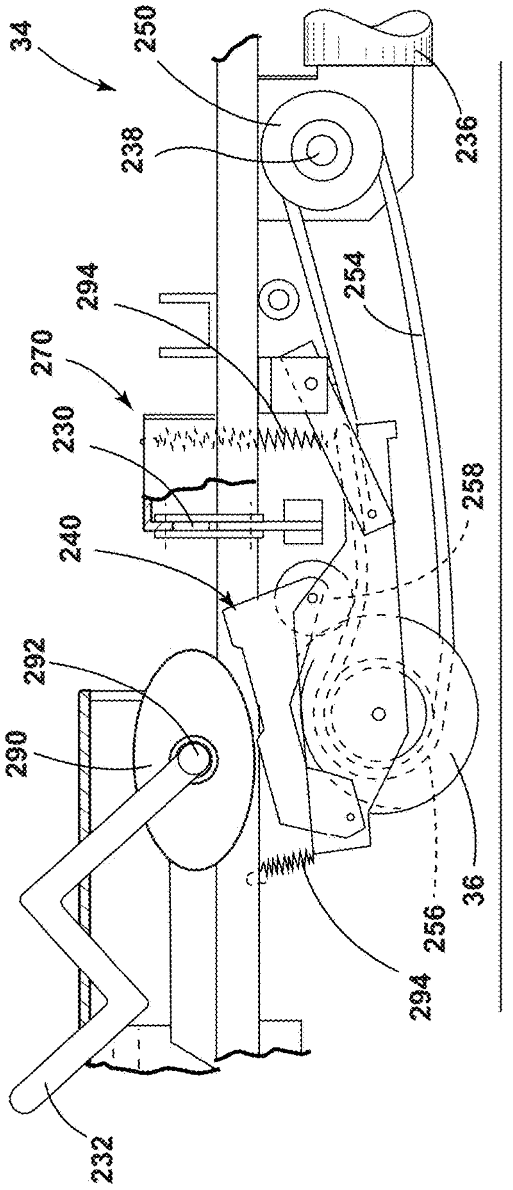
FIG. 12 is a partial side elevational view of a power drive system with a cam and foot bar in a manual drive mode with a drive wheel spaced from a floor surface, according to the present disclosure.
Figure 13:
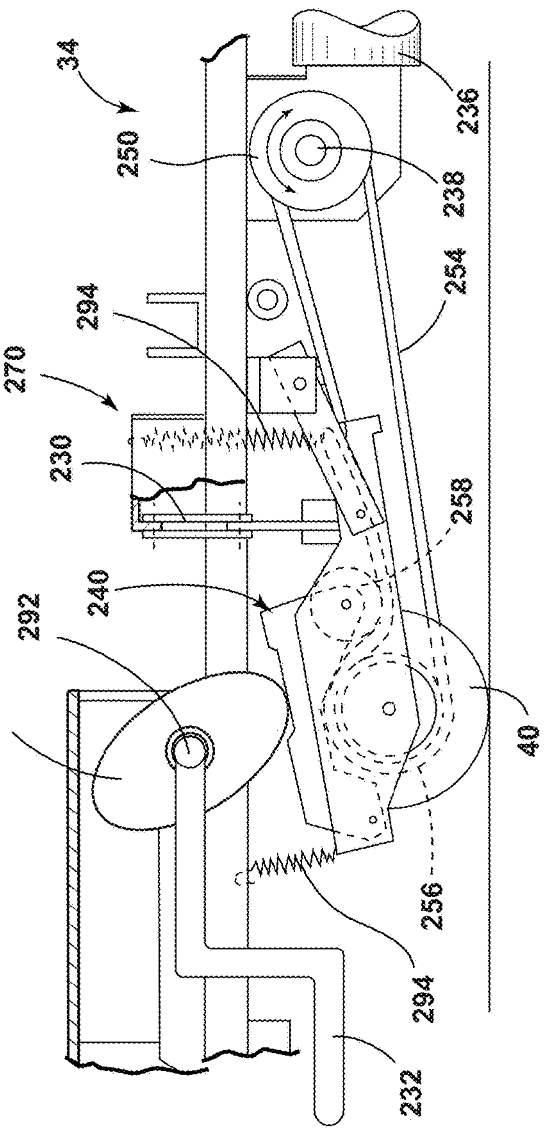
FIG. 13 is a partial side elevational view of a power drive system with a cam and a foot bar in a power drive mode with a drive wheel engaging a floor surface, according to the present disclosure.

Referring to FIGS. 12 and 13, the drive wheel 36 may be manually operable between the retracted position 38 and the deployed position 40 via the foot bar 232. While illustrated and described as the foot bar 232, generally movably with the foot of the caregiver, the bar 232 may be in other practicable locations and may also be turned by hand. The foot bar 232 may be operably coupled with a cam 290 via a shaft 292. Rotation or movement of the foot bar 232 causes rotation of cam 290. The cam 290 is generally an oblong or non-symmetrical shape to adjust the drive wheel 36 based on different positions. For example, as illustrated in FIG. 12, when the cam 290 is in a first position, the cam 290 is moved away from the drive wheel 36 and biasing members 294 utilize a biasing force to shift the drive wheel 36 from the floor. The movement of the cam 290 by the foot bar 232 allows space for the drive wheel 36 to shift away from the floor.

As illustrated in FIG. 13, upon application of a force on the foot bar 232, the foot bar 232 rotates, causing the cam 290 to rotate toward the drive wheel 36. The cam 290 presses against the drive wheel 36 or a housing for the drive wheel 36, overcoming the biasing force, and moving the drive wheel 36 to engage the floor. The care cart assembly 20 may include one or both of the cam 290 and the actuator link assembly 230. In such examples, the drive wheel 36 may be movable via the foot bar 232 and the cam 290 and/or the actuator link assembly 230, which may provide both manual and electronic/automatic movement of the drive wheel 36. The actuator link assembly 230 may also be movable in conjunction with the foot bar 232.

Figure 14:
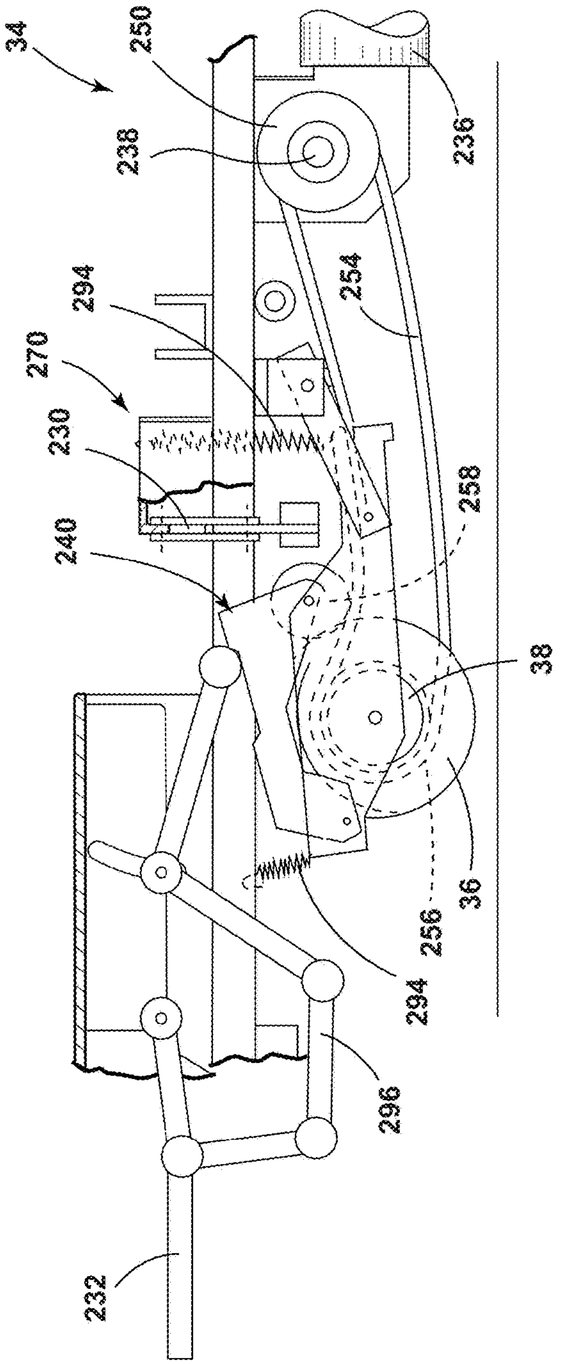
FIG. 14 is a partial side elevational view of a power drive system with a linkage system and foot bar in a manual drive mode with a drive wheel spaced from a floor surface, according to the present disclosure.
Figure 15:
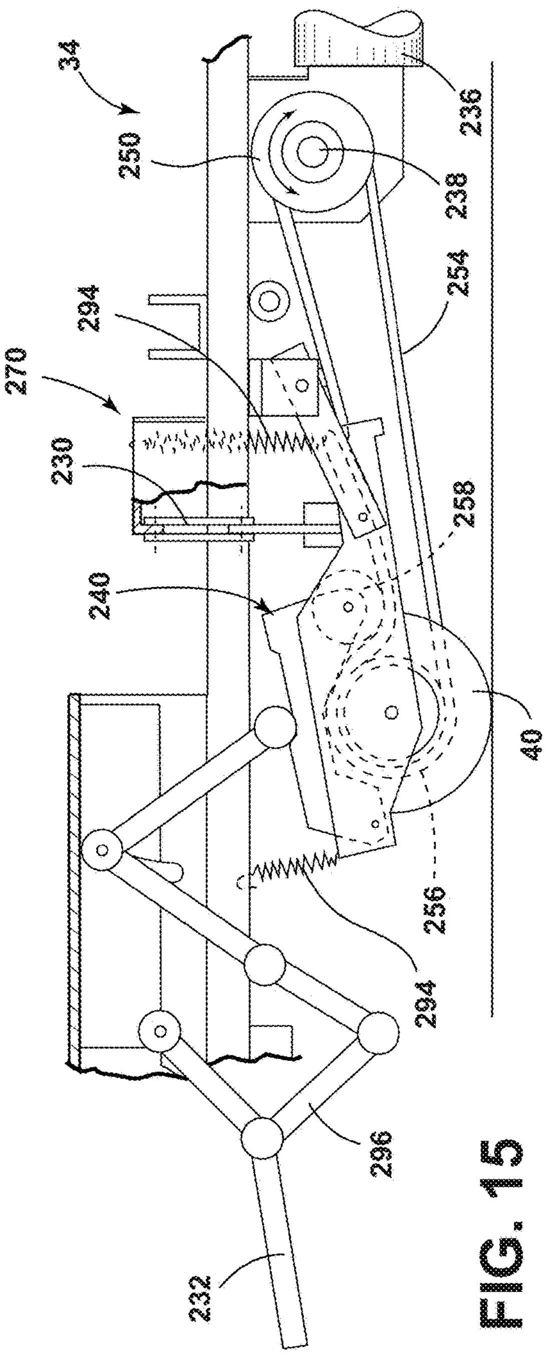
FIG. 15 is a partial side elevational view of a power drive system with a linkage system and a foot bar in a power drive mode with a drive wheel engaging a floor surface, according to the present disclosure.

Referring to FIGS. 14 and 15, the drive wheel 36 may be adjustable between the retracted position 38 and the deployed position 40 using a linkage system 296. The linkage system 296 includes a plurality of linkages that are adjustable relative to one another. The linkage system 296 may be operable between a bent or folded position and a lengthened position based on the position of the foot bar 232. For example, as illustrated in FIG. 14, the linkage system 296 is folded, allowing the biasing members 294 to retract the drive wheel 36 away from the floor. The biasing members 294 assist in lifting the drive wheel 36.

As illustrated in FIG. 15, when the caregiver steps on or applies force to the foot bar 232, the foot bar 232 is configured to adjust and lengthen the linkage system 296, which causes the linkage system 296 to press against the drive wheel 36. Accordingly, the linkage system 296 adjusts and causes the drive wheel 36 to move against the biasing force and engage the floor. The care cart assembly 20 may include one or both of the linkage system 296 and the actuator link assembly 230. In such examples, the drive wheel 36 may be movable via the foot bar 232 and the linkage system 296 and/or the actuator link assembly 230, which may provide both manual and electronic/automatic movement of the drive wheel 36. The actuator link assembly 230 may also be movable in conjunction with the foot bar 232. Additional or alternative assemblies and systems may be used to transfer motion from the foot bar 232 to the drive wheel 36.

As described herein, the care cart assembly 20 provides the power for moving the support apparatus 12 about the medical facility. In this way, the support apparatus 12 is free of a separate power drive system 202, and the power driving is provided by the care cart assembly 20.

Figure 16:
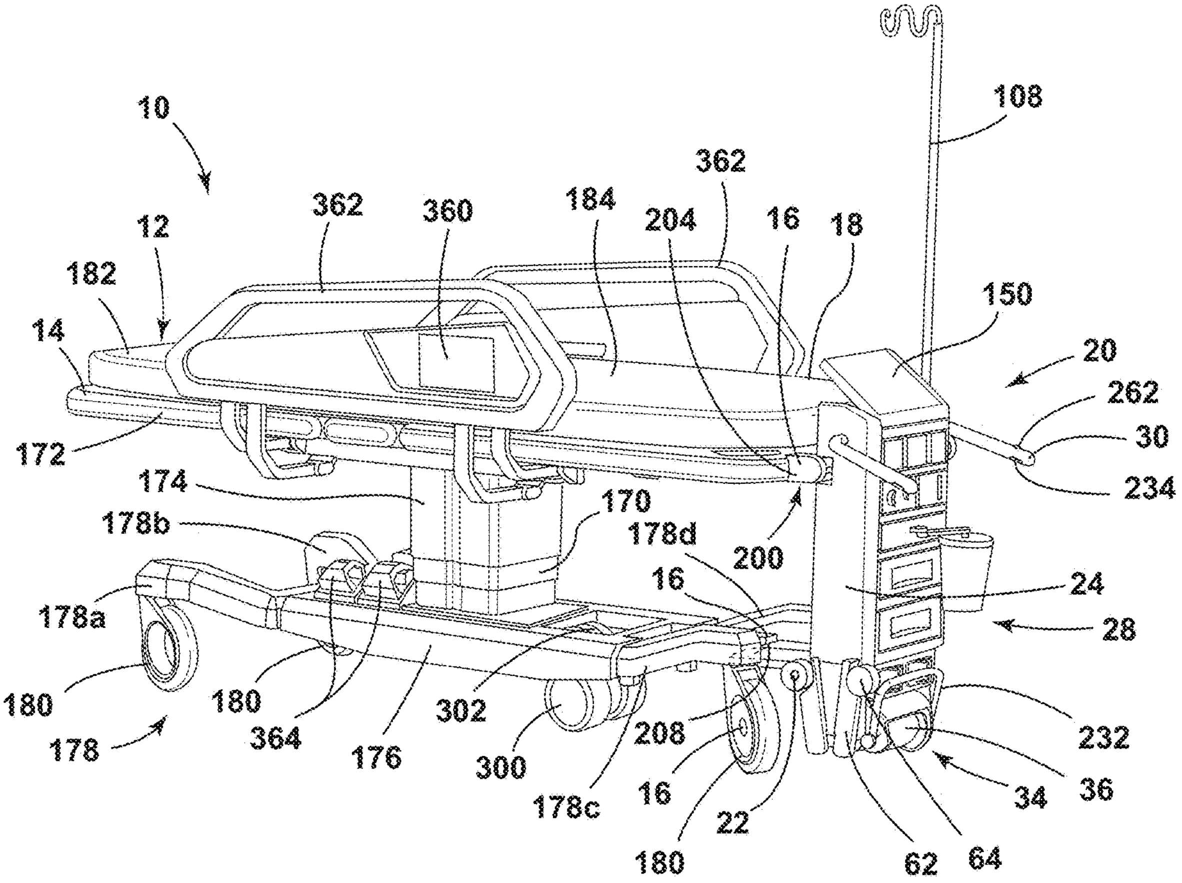
FIG. 16 is a side perspective view of a transport system with a care cart assembly docked to a support apparatus and wheels of the care cart assembly in a raised position, according to the present disclosure.

Referring to FIG. 16, in certain aspects, the power drive system 34 of the care cart assembly 20 may assist the power drive system 202 of the support apparatus 12. In this way, the power drive system 34 of care cart assembly 20 may be used in combination with a separate power drive system 202 of the support apparatus 12. Accordingly, the power drive mode for the support apparatus 12 may be supplemented by the care cart assembly 20, which may be advantageous for using less power for each power drive system 34. Reducing power consumption during transport may increase the power available for the support apparatus 12 and the care cart assembly 20 for supporting other devices.

The power drive system 34 of the support apparatus 12 is generally substantially similar or the same as the power drive system 34 described with respect to the care cart assembly 20. The power drive system 202 includes a power drive wheel 300, which is coupled to the base support 176. In various aspects, the base support 176 defines a receiving aperture 302 for the power drive wheel 36 when the power drive wheel 300 is retracted from the floor surface.

The drive wheel 300 is operable between a deployed position and a retracted position. The power drive system 202 can be operated in a manual drive mode, as well as a power drive mode similar to the power drive system 34 described in FIGS. 8-11. The power drive wheel 300 may be adjusted via an actuator link assembly or via a foot bar. Moreover, the deployment of the drive wheel 300 and the activation of the power drive system 202 may be caused by any one or more of the inputs described herein with respect to the care cart assembly 20. The power drive system 202 generally includes a motor, a clutch to couple the motor with the drive wheel 300, a belt, and an idler configured to function as described with respect to the care cart assembly 20.

Moreover, when both power drive systems 34, 202 are activated, the support arms 62 of the care cart assembly 20 can be rotated to disengage the wheels 64 of the care cart assembly 20 from the floor. The support arms 62 of the care cart assembly 20 are configured to rotate about 90°. The support arms 62 may rotate to a lowered position to engage the wheels 64 with the underlying floor surface, and a raised position to lift the wheels 64 from the underlying floor surface. When the wheels 64 are raised, the care cart assembly 20 is generally supported by one or both of the engagement with the support apparatus 12 and the drive wheel 36. Lifting of the wheels 64 may be advantageous when driving the support apparatus 12 with the care cart assembly 20. It is also contemplated that the support arms 62 may remain lowered for the wheels 64 to engage the floor surface while moving the care cart assembly 20 and the support apparatus 12 each in the power drive mode.

Figure 17:
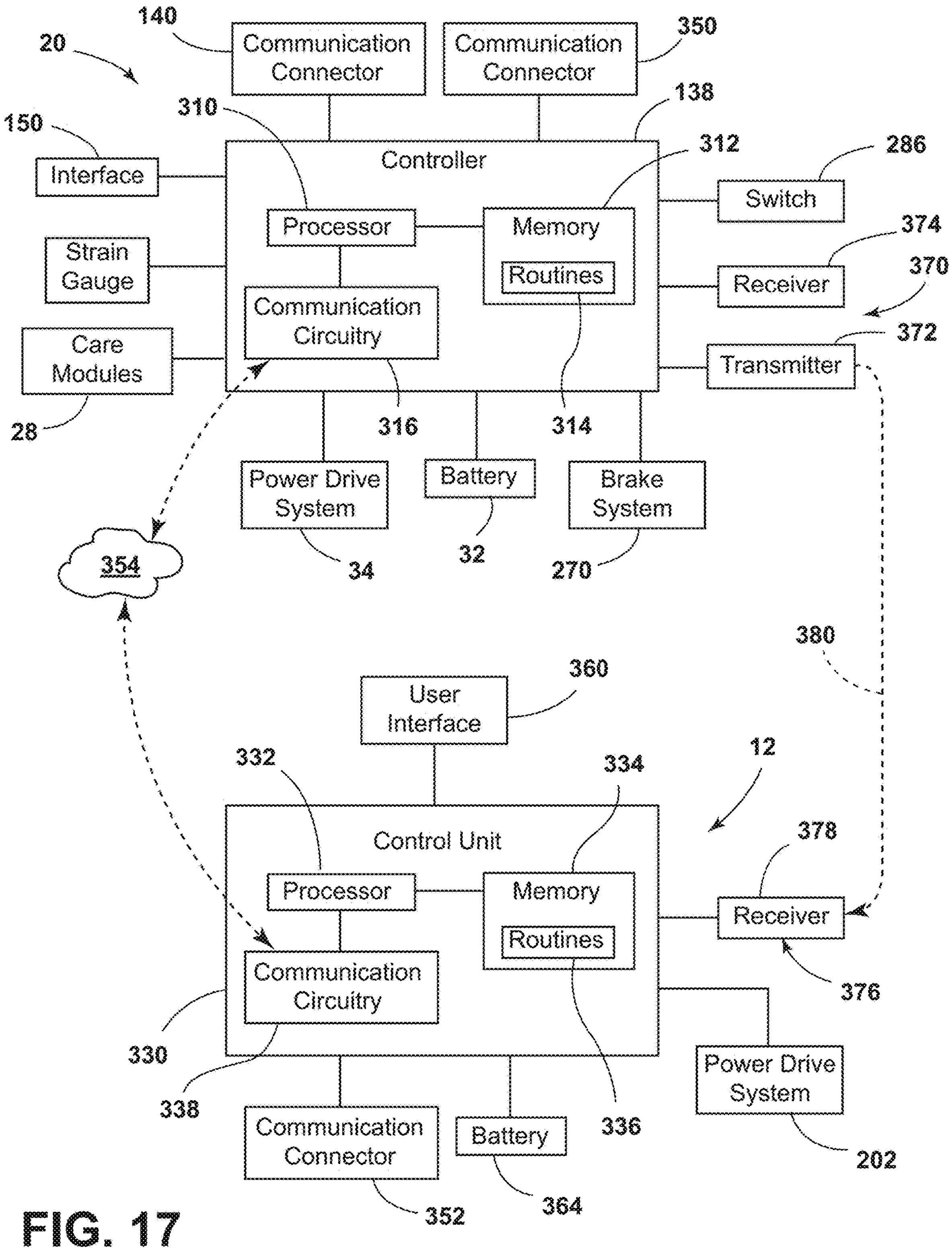
FIG. 17 is a block diagram of a transport system with a support apparatus and a care cart assembly in communication via a communication network and a charging interface, according to the present disclosure.

Referring still to FIG. 16, as well as FIG. 17, the care cart assembly 20 is configured to communicate with the support apparatus 12. The controller 138 of the care cart assembly 20 includes a processor 310, a memory 312, and other control circuitry. Instructions or routines 314 are stored in the memory 312 and executable by the processor 310. The controller 138 also includes communication circuitry 316 configured for bidirectional wired and/or wireless communication.

The support apparatus 12 includes a control unit 330 having a processor 332, a memory 334, and other control circuitry. Instructions or routines 336 are stored in memory 334 and executable by the processor 332. The support apparatus 12 also includes communication circuitry 338 configured for bidirectional wired and/or wireless communication.

The controller 138 of the care cart assembly 20 is configured to communicate with the control unit 330 of the support apparatus 12. In various examples, the docking of the care cart assembly 20 may provide for wired communication between the care cart assembly 20 and the support apparatus 12. In such examples, each of the care cart assembly 20 and the support apparatus 12 have mating communication connectors 350, 352 that engage one another to provide wired communication therebetween.

Referring still to FIG. 17, in additional or alternative configurations, the controller 138 is configured to communicate with the control unit 330 via a wireless communication network 354. The communication network 354 may be part of a network of the medical facility, which may include a combination of wired connections (e.g., Ethernet), as well as wireless connections, which may include the wireless communication network 354. The communication network 354 may include a variety of electronic devices, which may be configured to communicate over various wired or wireless communication protocols. The communication network 354 may include a wireless router through which the remotely accessed devices may be in communication with one another as well as a local server.

The communication network 354 may be implemented via one or more direct or indirect nonhierarchical communication protocols, including but not limited to, Bluetooth®, Bluetooth® low energy (BLE), Thread, Ultra-Wideband, Z-wave, ZigBee, etc. Additionally, the communication network 354 may correspond to a centralized or hierarchal communication network 354 where one or more of the devices communicate via the wireless router (e.g., a communication routing controller). Accordingly, the communication network 354 may be implemented by a variety of communication protocols, including, but not limited to, global system for mobile communication (GSM), general packet radio services, code division multiple access, enhanced data GSM environment, fourth generation (4G) wireless, fifth generation (5G) wireless, Wi-Fi, world interoperability for wired microwave access (WiMAX), local area network, Ethernet, etc. By flexibly implementing the communication network 354, the various devices and servers may be in communication with one another directly via the wireless communication network 354, or cellular data connection.

In certain aspects, the support apparatus 12 and/or the care cart assembly 20 may be capable of communicating wirelessly via a wireless communication module. The wireless communication module generally communicates via an SPI link with circuitry associated with the support apparatus 12 (e.g., the communication circuitry 338) or the care cart assembly 20 (e.g., communication circuitry 316) and the wireless 802.11 link with wireless access points. The wireless access points are generally coupled to Ethernet switches via 802.3 links. It is contemplated that the wireless communication modules may communicate with the wireless access points via any of the wireless protocols disclosed herein. Additionally or alternatively, the Ethernet switches may generally communicate with Ethernet via 802.3 link. Ethernet is also in communication with the local server, allowing information and data to be communicated between the care cart assembly 20 and the support apparatus 12.

Figure 18:
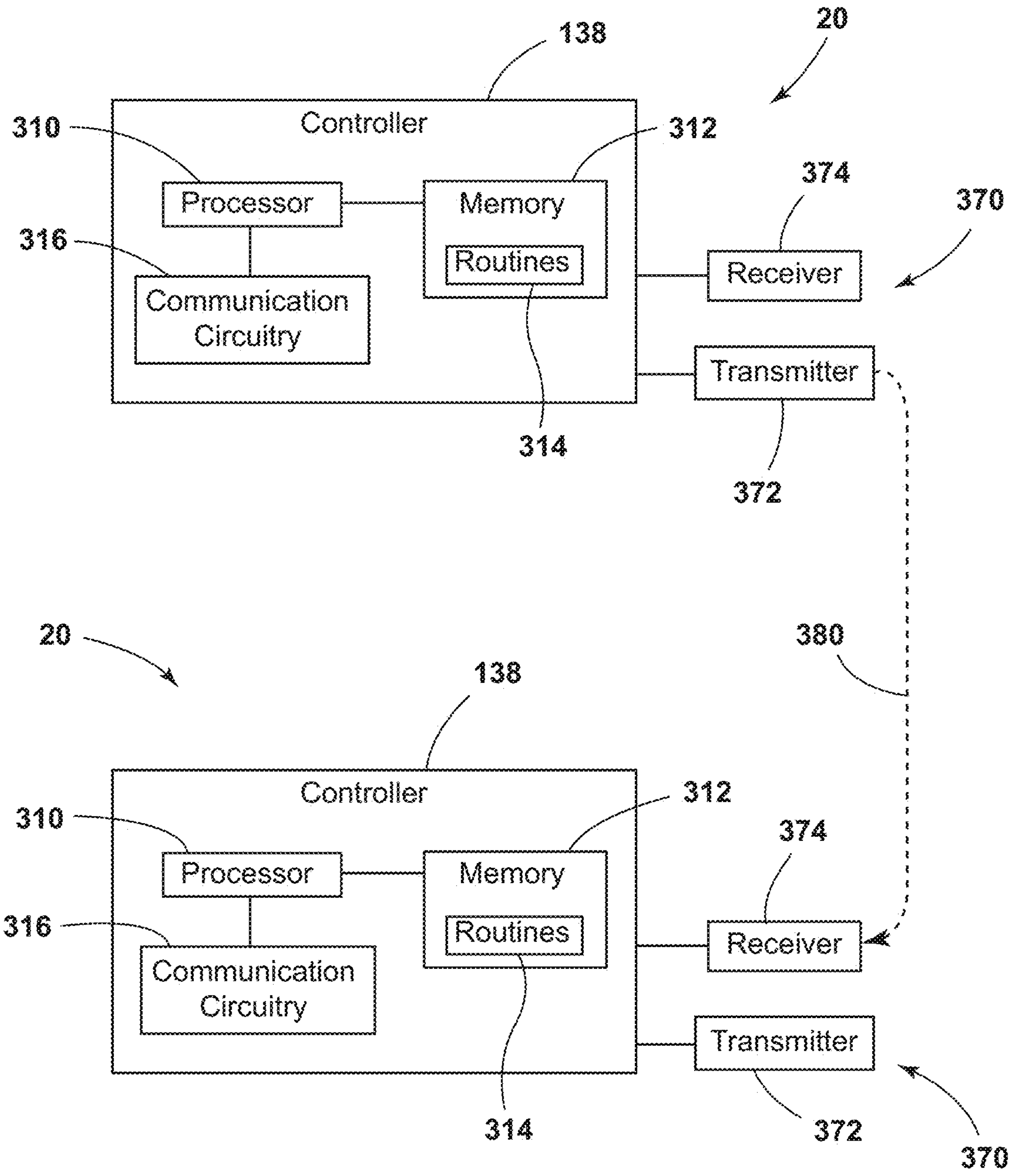
FIG. 18 is a block diagram of a transport system with multiple care cart assemblies communicative via a charging interface, according to the present disclosure.

Referring still to FIGS. 16 and 17, as well as FIG. 18, the communication between the care cart assembly 20 and the support apparatus 12 may be advantageous for providing information on both the user interface 150 of the care cart assembly 20 and a user interface 360 on the support apparatus 12. Generally, the user interface 150 on the support apparatus 12 is coupled to a siderail 362 of the support apparatus 12. During transport, one caregiver can engage the transport handles 30 to drive the support apparatus 12, while a second caregiver generally grasps the siderails 362 and assists in steering and maneuvering the support apparatus 12. Accordingly, it may be advantageous for the second caregiver to be able to view the information from the care cart assembly 20, such as from the care modules 28, the power drive system 34, the battery 32, etc.

The care cart assembly 20 includes the battery 32 for powering the components of the care cart assembly 20, including the care modules 28, the user interface 150, and the power drive system 34. The battery 32 may be configured to be selectively inserted and removed from the body 24. Such configurations are advantageous for utilizing rechargeable batteries 32. Further, the battery 32 may be fixed in the body 24 and may be charged wirelessly or with a cord. Moreover, the battery 32 for the care cart assembly 20 and a battery 364 for the support apparatus 12 may be similar or the same to allow for interchangeable batteries 32, 364 and increased flexibility of the transport system 10.

Referring still to FIGS. 16-18, the care cart assembly 20 may also be utilized to help provide power to the support apparatus 12. In various examples, the support apparatus 12 includes one or more batteries 364, which are illustrated on the base support 176. In various aspects, these batteries 364 power various devices or features included in or coupled to the support apparatus 12. The batteries 364 on the support apparatus 12 and the battery 32 of the care cart assembly 20 are generally rechargeable. The care cart assembly 20 may be used to charge or power the battery 364 of the support apparatus 12.

In various aspects, the care cart assembly 20 includes a charging assembly 370 with a transmitter 372 and a receiver 374 coupled to the battery 32. The support apparatus 12 also includes a charging assembly 376 including at least a receiver 378 coupled to the battery 364. When the care cart assembly 20 is docked to the head end 18 of the support apparatus 12, the transmitter 372 of the care cart assembly 20 disposed adjacent to or abutting the receiver 378 on the support apparatus 12. For example, the transmitter 372 is on the support arm 62*a* of the care cart assembly 20, and the receiver 378 is on the support leg 178*c* of the support apparatus 12 which are configured to be disposed adjacent to or abutting one another when the care cart assembly 20 is docked to the support apparatus 12.

To charge the battery 364 of the support apparatus 12, the care cart assembly 20 is docked to the support apparatus 12, moving the transmitter 372 adjacent to the receiver 378. Generally, the transmitter 372 and the receiver 378 components are disposed at a distance in a range of up to about 12 inches. Once aligned, the transmitter 372 and the receiver 378 selectively communicate with one another. This communication can be automatic or in response to an input from the caregiver. The transmitter 372 and the receiver 378 are generally interacting via a charging interface 380, which may include at least one of inductive coupling and capacitive coupling.

The transmitter 372 is a source configured to transfer power from the battery 32 of the care cart assembly 20 to the receiver 378 of the support apparatus 12. A wire or cable extends between the transmitter 372 and the battery 32. The battery 32 of the care cart assembly 20 relays power to the transmitter 372. The receiver 378 captures energy from the charging interface 380 and transmits the received power to the battery 364 on the support apparatus 12.

Referring still to FIG. 17, in inductive coupling examples, the transmitter 372 and the receiver 378 are generally configured as coils. An alternating current is generated through the transmitter 372 to create an oscillating magnetic or electromagnetic field between the transmitter 372 and the receiver 378 in the charging interface 380. The electromagnetic field passes through the receiver 378 to induce an alternating voltage. The receiver 378 includes circuitry configured to extract or capture power from the electromagnetic field and convert the energy into electricity.

In the capacitive coupling examples, the transmitter 372 and the receiver 378 are generally configured as electrodes. An alternating voltage is applied to the transmitter 372 by the battery 32 to generate an oscillating electric field. The electric field generally induces an alternating potential on the receiver 378. Capacitance is used for the transfer of power between the transmitter 372 and the receiver 378 with the space between the transmitter 372 and the receiver 378 serving as a dielectric. The receiver 378 includes the circuitry to capture or extract power from an electric field and convert the energy into electricity. It is contemplated that other forms of wireless transmission may be employed, such as, for example, magnetic resonance, loose coupled resonance, and electromagnetic radiation without departing from the teachings herein. The support apparatus 12 may also include circuitry for directing and controlling the power supplied to the battery 364.

Figure 19:
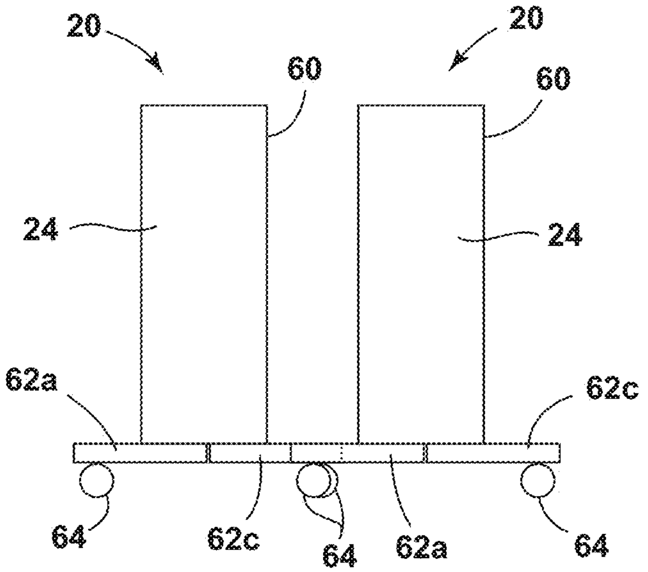
FIG. 19 is a schematic side elevational view of multiple care cart assemblies in a nested position, according to the present disclosure.
Figure 20:
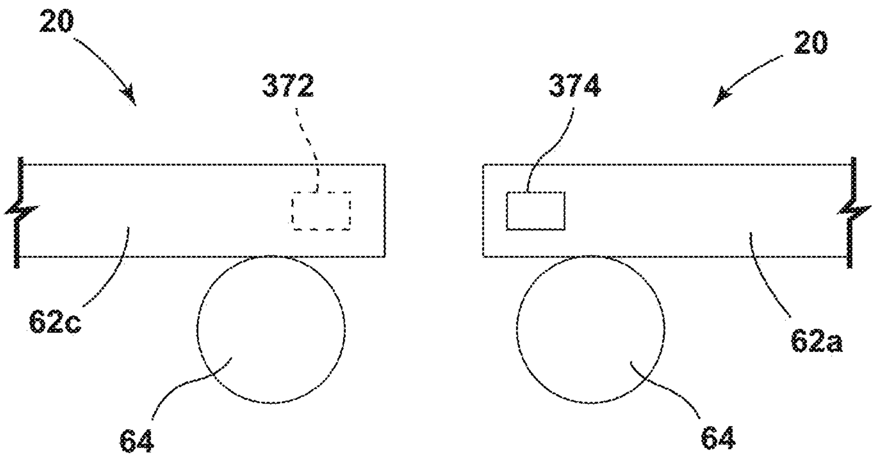
FIG. 20 is a partial schematic side elevational view of a support arm from a first care cart assembly having a receiver and a support arm from a second care cart assembly having a transmitter to selectively communicate with the receiver via a charging interface, according to the present disclosure.

Referring again to FIG. 18, as well as FIGS. 19 and 20, the care cart assemblies 20 may also be configured to charge one another when in a nested position or arrangement described herein. Accordingly, the transmitter 372 on one care cart assembly 20 is configured to interact with the receiver 378 of the support apparatus 12, as well as the receiver 374 of another care cart assembly 20. When the care cart assemblies 20 are disposed adjacent to one another in the nested position or arrangement, the receiver 374 of the first care cart assembly 20 is configured to selectively communicate with the transmitter 372 of the second care cart assembly 20 to transfer power between the two. The transfer of power may be through inductive or capacitive coupling as described with respect to power transfer with the support apparatus 12.

Referring to FIGS. 1-20 the transport system 10 provides a flexible system of multiple care cart assemblies 20 and multiple support apparatuses 12 that can be used for maximizing treatment for the patient and efficiency for the caregiver. The care cart assemblies 20 can carry multiple care modules 28, which can be interchanged to provide personalized and customized support for treatment and care. Further, the care cart assemblies 20 can be driven by the power drive system 34, which can also drive and propel a connected support apparatus 12. The driving force provided by the care cart assembly 20 can also be adjustable based on the force provided by the caregiver on the transport handles 30, which may be measured by the strain gauge 234. The care cart assemblies 20 can also support various features and functions of the support apparatus 12, such as by providing power to the support apparatus.

Use of the present device may provide for a variety of advantages. For example, the transport system 10 may include multiple care cart assemblies 20 and multiple support apparatuses 12, each having a variety of configurations. Additionally, the care cart assembly 20 includes the care modules 28, which may be interchanged with one another based on the support apparatus 12, the patient, the unit or department, etc. Further, the care cart assembly 20 includes the power drive system 34, which is configured to propel and drive the support apparatus 12 about the medical facility. Moreover, the power drive system 34 of the care cart assembly 20 can be used as the primary or sole driving force for driving movement of the support apparatus 12. Also, the power drive system 34 of the care cart assembly 20 can be used in combination with the power drive system 202 of the support apparatus 12, reducing power consumption.

Further, the care cart assembly 20 may be in communication with the support apparatus 12 to communicate both power and information. The care cart assembly 20 may charge the battery 364 of the support apparatus 12 through wireless charging. Additionally, the care cart assembly 20 may communicate information to the support apparatus 12 to be viewed on the user interface 360 on the siderail 362, which is advantageous for the additional caregivers assisting in transporting the support apparatus 12. Additionally, care cart assemblies 20 may be arranged in the nested configuration to allow wireless charging between multiple care cart assemblies 20. Moreover, the care cart assembly 20 can maximize efficiency in treating the patient and transporting the patient. Additional benefits or advantages may be realized and/or achieved.

Each of the controller 138 and the control unit 330 disclosed herein may include various types of control circuitry, digital or analog, and may each include a processor 310, 332, a microcontroller, an application specific integrated circuit (ASIC), or other control circuitry configured to perform various inputs or output, control, analysis, or other functions described herein. The memory 312, 334 described herein may be implemented in a variety of volatile and nonvolatile memory formats. Routines 314, 336 include operating instructions to enable the various methods described herein.

The device and system disclosure is further summarized in the following paragraphs and is further characterized by commissions of any and all various aspects described herein.

According to another aspect of the present disclosure, a transport system for a medical facility includes a support apparatus including a frame assembly. The frame assembly includes a frame connector on a head end thereof. A care cart assembly includes a cart connector that is configured to engage the frame connector to couple the care cart assembly to the frame assembly. The care cart assembly is disposed adjacent to the head end when coupled to the support apparatus. The care cart assembly includes a body defining receiving spaces configured to receive care modules. Transport handles are coupled to the body. A battery is coupled to the body and configured to power the care modules disposed within the receiving spaces. A power drive system is coupled to the body and powered by the battery. The power drive system includes a power drive wheel operable between a retracted position and a deployed position. The care cart assembly is configured to drive movement of the support apparatus with the power drive system when the power drive wheel is in the deployed position.

According to another aspect of the present disclosure, transport handles are configured to rotate between a vertical position and a horizontal position.

According to another aspect of the present disclosure, a power drive wheel is adjustable via a foot bar.

According to another aspect of the present disclosure, a care cart assembly includes wheels for engaging an underlying floor surface. The power drive wheel is centrally located between the wheels.

According to another aspect of the present disclosure, a portable intravenous pole includes a pole support and wheels for engaging an underlying floor surface. A care cart assembly includes a latching hook for selectively coupling to the pole support. The intravenous pole is moved along the underlying floor surface with the care cart assembly.

According to another aspect of the present disclosure, a support apparatus includes a power drive wheel configured to selectively engage an underlying floor surface in a power drive mode. A power drive system of a care cart assembly and the power drive wheel of the support apparatus drive the movement of the support apparatus.

According to another aspect of the present disclosure, a care cart assembly includes support arms coupled to a body and wheels coupled to the support arms. The support arms are configured to move between raised and lowered positions.

According to another aspect of the present disclosure, support arms are in a raised position to lift wheels from an underlying floor surface when a power drive wheel of a support apparatus is engaging the underlying floor surface.

According to another aspect of the present disclosure, a frame assembly includes an upper frame coupled to a base frame.

According to another aspect of the present disclosure, a frame connector is a bayonet projection extending from an upper frame. A cart connector is a receiving socket configured to receive the bayonet projection.

According to another aspect of the present disclosure, a frame connector is a projection extending from an upper frame. A cart connector is a receiving socket configured to receive the projection.

According to another aspect of the present disclosure, a frame connector is a deployable arm coupled to a base frame.

According to another aspect of the present disclosure, a support apparatus includes rollers coupled to a base frame. A frame connector is coupled to at least one of the rollers.

According to another aspect of the present disclosure, a care cart assembly is coupled to at least one of a base frame and an upper frame.

According to another aspect of the present disclosure, a transport system for a medical facility includes a support apparatus including a frame assembly. The frame assembly includes a frame connector. A care cart assembly includes a cart connector selectively coupled with the frame connector. The care cart assembly includes a body defining receiving spaces that are configured to receive care modules. Wheels are operably coupled to the body and configured to engage an underlying floor surface. A power drive system includes a power drive wheel operable between a retracted position spaced from the underlying floor surface and a deployed position engaging the underlying floor surface. The care cart assembly is configured to drive movement of the support apparatus with the power drive system when coupled with the support apparatus and the power drive wheel is engaging the underlying floor surface.

According to another aspect of the present disclosure, care modules include at least one of an infusion pump, an intravenous pump, a portable suction assembly, a ventilator, a heart rate monitor, a respiration monitor, onboard storage for leads, an oxygen holder, and an oxygen generator.

According to another aspect of the present disclosure, a frame assembly includes a base frame and an upper frame coupled to the base frame. A support apparatus includes rollers coupled to the base frame.

According to another aspect of the present disclosure, a frame connector is on a base frame.

According to another aspect of the present disclosure, a frame connector is on an upper frame.

According to another aspect of the present disclosure, a frame connector is on at least one roller.

According to another aspect of the present disclosure, a support apparatus is free of a power drive wheel separate from a power drive system of a care cart assembly.

According to another aspect of the present disclosure, a care cart assembly includes a battery configured to power a power drive system. The battery is configured to power care modules within receiving spaces.

According to another aspect of the present disclosure, a support apparatus includes a battery. A battery of a care cart assembly is configured to charge the battery of the support apparatus.

According to another aspect of the present disclosure, a support apparatus includes a receiver coupled with a battery of the support apparatus. A care cart assembly includes a transmitter coupled with a battery of the care cart assembly and configured to selectively communicate with the receiver to charge the battery of the support apparatus.

According to another aspect of the present disclosure, a transmitter and a receiver selectively communicate via at least one of capacitive coupling and inductive coupling to charge the apparatus battery.

According to another aspect of the present disclosure, a transport system for a medical facility includes a support apparatus including a frame assembly. The frame assembly includes a frame connector. At least one care cart assembly includes a cart connector selectively coupled with the frame connector. The at least one care cart assembly includes a body defining receiving spaces that are configured to receive care modules. Wheels are operably coupled to the body and configured to engage an underlying floor surface. A power drive system includes a power drive wheel operable between a retracted position spaced from the underlying floor surface and a deployed position engaging the underlying floor surface. The care cart assembly is configured to drive movement of the support apparatus with the power drive system when coupled with the support apparatus and the power drive wheel is engaging the underlying floor surface.

According to another aspect of the present disclosure, a frame assembly includes a base frame and an upper frame coupled to the base frame. A support apparatus includes rollers coupled to the base frame. The frame connector is on at least one of the base frame and at least one of the rollers.

According to another aspect of the present disclosure, a frame assembly includes a base frame and an upper frame coupled to the base frame. A frame connector is on the upper frame.

According to another aspect of the present disclosure, a transport system includes a support apparatus including a frame assembly with a frame connector at a head end. At least one care cart assembly includes a cart connector. The cart connector is configured to engage the frame connector to couple the at least one care cart assembly to the head end of the support apparatus. The at least one care cart assembly includes a body defining receiving slots and care modules for use in treating a patient during transport. The care modules are selectively disposed within the receiving slots. A battery is coupled to the body. The battery is configured to power the care modules disposed within the receiving slots. A power drive system is coupled to the body. The power drive system includes a power drive wheel that is configured to drive movement of the support apparatus. A controller is communicatively coupled to the power drive system. The controller is configured to deploy the power drive wheel, activate the power drive system, and determine the care modules disposed within the receiving slots.

According to another aspect of the present disclosure, a body and care modules have mating communication connectors to provide communication between a controller and the care modules.

According to another aspect of the present disclosure, at least one care cart assembly includes a graphical user interface. Icons related to care modules determined to be in receiving slots are displayed on the graphical user interface.

According to another aspect of the present disclosure, at least one care cart assembly includes a first care cart assembly and a second care cart assembly. Care modules disposed within receiving slots of the first care cart assembly are different than care modules disposed within receiving slots of the second care cart assembly.

According to another aspect of the present disclosure, each of first and second care cart assemblies includes a transmitter and a receiver. The transmitter of the first care cart assembly is configured to selectively communicate with the receiver of the second care cart assembly to charge a battery of the second care cart assembly.

According to another aspect of the present disclosure, a transmitter of a first care cart assembly is configured to selectively communicate with a receiver of a second care cart assembly when the first and second care cart assemblies are disposed adjacent to one another in a nested arrangement.

According to another aspect of the present disclosure, a body of a second care cart assembly is disposed at least partially between wheels of the second care cart assembly when in a nested arrangement.

According to another aspect of the present disclosure, a care cart assembly for a transport system includes a body having a cart connector configured to engage a support apparatus. The body defines receiving slots configured to receive care modules. Wheels are coupled to the body via a support arm and configured to engage an underlying floor surface. A battery is coupled to the body. A power drive system is coupled to the body. The power drive system includes a power drive wheel configured to drive movement of the support apparatus.

According to another aspect of the present disclosure, a care cart assembly for a transport system that includes a support apparatus where the care cart assembly includes a body having a cart connector configured to engage a support apparatus. The body defines receiving slots configured to receive care modules. Wheels are coupled to the body via a support arm and configured to engage a floor surface. A battery is coupled to the body. A power drive system is coupled to the body. The power drive system includes a power drive wheel operable between a retracted position spaced from the floor surface and a deployed position engaging the floor surface. When the power drive wheel is in the deployed position, the power drive wheel is configured to drive movement of the care cart assembly and, consequently, the support apparatus. The care cart assembly also includes a controller communicatively coupled to the power drive system.

According to another aspect of the present disclosure, a controller is configured to deploy a power drive wheel, activate a power drive system, and determine care modules disposed in receiving slots.

According to another aspect of the present disclosure, a body and care modules have mating communication connectors to provide communication between a controller and the care modules.

According to another aspect of the present disclosure, a transport means for a medical facility includes a support means including a frame assembly with a from connector means on a head end thereof and a storage and drive means including a cart connector configured to engage the frame connector means to couple the storage and drive means to the frame assembly. The storage and drive means is disposed adjacent to the head end when coupled to the support means. The storage and drive means includes a body defining receiving slots configured to receive care modules and transport handles coupled to the body. A power means is coupled to the body and configured to power the care modules disposed within the receiving slots. A power drive means coupled to the body and powered by the power means. The power drive means includes a power drive wheel operable between a retracted position and a deployed position. The storage and drive means is configured to drive movement of the support means with the power drive means when the power drive wheel is in the deployed position.

Related applications, for example those listed herein, are fully incorporated by reference. Assertions within the related applications are intended to contribute to the scope and interpretation of the information disclosed herein. Any changes between any of the related applications and the present disclosure are not intended to limit the scope or interpretation of the information disclosed herein, including the claims. Accordingly, the present application includes the scope and interpretation of the information disclosed herein as well as the scope and interpretation of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A transport system for a medical facility, comprising:
- a support apparatus including a frame assembly, wherein the frame assembly includes a frame connector on a head end thereof; and
- a care cart assembly including a cart connector, wherein the cart connector is configured to engage the frame connector to couple the care cart assembly to the frame assembly, and wherein the care cart assembly is disposed adjacent to the head end when coupled to the support apparatus, wherein the care cart assembly includes:
  - a body defining receiving spaces configured to receive care modules;
  - transport handles coupled to the body;
  - a battery coupled to the body and configured to power the care modules disposed within the receiving spaces; and
  - a power drive system coupled to the body and powered by the battery, wherein the power drive system includes a power drive wheel operable between a retracted position and a deployed position, wherein the care cart assembly is configured to drive movement of the support apparatus with the power drive system when the power drive wheel is in the deployed position.

2. The transport system of claim 1, wherein the transport handles are configured to rotate between a vertical position and a horizontal position.

3. The transport system of claim 1, wherein the power drive wheel is adjustable via a foot bar.

4. The transport system of claim 1, wherein the care cart assembly includes:
- wheels for engaging an underlying floor surface, and wherein the power drive wheel is centrally located between the wheels.

5. The transport system of claim 1, further comprising:
- a portable intravenous pole including a pole support and wheels for engaging an underlying floor surface, wherein the care cart assembly includes a latching hook for selectively coupling to the pole support, and wherein the portable intravenous pole is moved along the underlying floor surface with the care cart assembly.

6. The transport system of claim 1, wherein the support apparatus includes:
- a power drive wheel configured to selectively engage an underlying floor surface in a power drive mode, and wherein the power drive system of the care cart assembly and the power drive wheel of the support apparatus drive the movement of the support apparatus.

7. The transport system of claim 1, wherein the frame assembly includes an upper frame coupled with a base frame, and wherein the frame connector is a projection extending from the upper frame, and further wherein the cart connector is a receiving socket configured to receive the projection.

8. The transport system of claim 1, wherein the frame assembly includes an upper frame coupled with a base frame, and wherein the frame connector is a deployable arm coupled to the base frame.

9. A transport system for a medical facility, comprising:
- a support apparatus including a frame assembly, wherein the frame assembly includes a frame connector; and
- at least one care cart assembly including a cart connector selectively coupled with the frame connector, wherein the at least one care cart assembly includes:
  - a body defining receiving spaces configured to receive care modules;
  - wheels operably coupled to the body and configured to engage an underlying floor surface; and
  - a power drive system including a power drive wheel operable between a retracted position spaced from the underlying floor surface and a deployed position engaging the underlying floor surface, wherein the at least one care cart assembly is configured to drive movement of the support apparatus with the power drive system when coupled with the support apparatus and the power drive wheel is engaging the underlying floor surface.

10. The transport system of claim 9, wherein the frame assembly includes a base frame and an upper frame coupled to the base frame, and wherein the support apparatus includes rollers coupled to the base frame, and further wherein the frame connector is on at least one of the base frame and at least one of the rollers.

11. The transport system of claim 9, wherein the frame assembly includes a base frame and an upper frame coupled to the base frame, and wherein the frame connector is on the upper frame.

12. The transport system of claim 9, wherein the at least one care cart assembly includes a battery configured to power the power drive system, and wherein the battery is configured to power the care modules within the receiving spaces, and further wherein the support apparatus includes a battery, the battery of the at least one care cart assembly configured to charge the battery of the support apparatus.

13. The transport system of claim 12, wherein the support apparatus includes a receiver coupled with the battery of the support apparatus, and wherein the at least one care cart assembly includes a transmitter coupled with the battery of the at least one care cart assembly and configured to selectively communicate with the receiver to charge the battery of the support apparatus.

14. The transport system of claim 9, wherein the at least one care cart assembly includes a controller, and wherein the body and the care modules have mating communication connectors to provide communication between the controller and the care modules.

15. The transport system of claim 9, wherein the at least one care cart assembly includes a graphical user interface, and wherein icons related to the care modules determined to be in the receiving spaces are displayed on the graphical user interface.

16. The transport system of claim 9, wherein the at least one care cart assembly includes:
- a first care cart assembly; and
- a second care cart assembly, and wherein the care modules disposed within the receiving spaces of the first care cart assembly are different than the care modules disposed within the receiving spaces of the second care cart assembly.

17. The transport system of claim 16, wherein each of the first and second care cart assemblies include a battery, a transmitter, and a receiver, wherein the transmitter of the first care cart assembly is configured to selectively communicate with the receiver of the second care cart assembly to charge the battery of the second care cart assembly.

18. A care cart assembly for a transport system that includes a support apparatus, the care cart assembly comprising:

a body having a cart connector configured to engage said support apparatus, wherein the body defines receiving slots configured to receive care modules;

wheels coupled to the body via support arms and configured to engage a floor surface;

a battery coupled to the body;

a power drive system coupled to the body, wherein the power drive system includes a power drive wheel operable between a retracted position spaced from the floor surface and a deployed position engaging the floor surface, wherein when the power drive wheel is in the deployed position the power drive wheel is configured to drive movement of said care cart assembly and, consequently, said support apparatus; and a controller communicatively coupled to the power drive system.

19. The care cart assembly of claim 18, wherein the controller is configured to:

deploy the power drive wheel;

activate the power drive system; and determine the care modules disposed within the receiving slots.

20. The care cart assembly of claim 18, wherein the body and the care modules have mating communication connectors to provide communication between the controller and the care modules.

* * * * *